US006990809B2

(12) United States Patent
Abouraphael

(10) Patent No.: US 6,990,809 B2
(45) Date of Patent: Jan. 31, 2006

(54) HYDROELECTRIC POWER PLANT DESIGNED TO TRANSFORM THE POTENTIAL ENERGY OF COMPRESSED GAS INTO MECHANICAL AND ELECTRICAL ENERGY THROUGH THE POTENTIAL ENERGY OF LIQUIDS

(76) Inventor: Afif Abouraphael, 250 Maisonneuve Blvd, Hull-Gatineau, Que (CA) J8X-3H8

( * ) Notice: Subject to any disclaimer, the term of this patent is extended or adjusted under 35 U.S.C. 154(b) by 19 days.

(21) Appl. No.: 10/862,159

(22) Filed: Jun. 7, 2004

(65) Prior Publication Data

US 2005/0247055 A1  Nov. 10, 2005

Related U.S. Application Data

(60) Provisional application No. 60/478,619, filed on Jun. 16, 2003.

(51) Int. Cl.
F03B 17/02 (2006.01)
(52) U.S. Cl. .......................................... 60/496; 60/495
(58) Field of Classification Search ................. 60/495, 60/496
See application file for complete search history.

(56) References Cited

U.S. PATENT DOCUMENTS

| 3,918,827 | A | * | 11/1975 | Conn et al. ..................... 415/5 |
| 4,054,031 | A | * | 10/1977 | Johnson ........................ 60/496 |
| 4,084,375 | A | * | 4/1978 | Horvath ........................ 60/496 |
| 4,233,813 | A | * | 11/1980 | Simmons ...................... 60/496 |
| 4,326,132 | A | * | 4/1982 | Bokel .......................... 290/1 R |
| 4,498,294 | A | * | 2/1985 | Everett ......................... 60/496 |
| 4,981,015 | A | * | 1/1991 | Simpson ....................... 60/496 |

OTHER PUBLICATIONS

Approximation Tool Used to Estimate the Horsepower Requirement. (1 page), Jul. 2, 2004.
Specifications of CompAir Compressor H5470 Used in the Calculations of the Positive Energy Produced in the Power Plant, The Subject of the Present Invention. (3 pages) (no date).

\* cited by examiner

*Primary Examiner*—Hoang Nguyen

(57) ABSTRACT

A renewable energy power generating plant is disclosed. It uses the renewable energy of fluids according to Archmedes Principale. It includes a liquid-filled pool, an endless chain looping around lower and upper cogwheels, containers attached to chain links receiving compressed air in the bottom of the pool, gas under pressure from black smokers in the sea bottom, or highly compressed natural gas using only its excess pressure. The ascending containers are propelled by a growing buoyant force during their ascent. According to Boyle's law, the volume of compressed gas injected into each ascending container expands and displaces an increasing quantity of liquid at shallower depths due to lower pressures. The weight of the liquid displaced by gas in ascending containers creates a steady torque on the axle of the upper cogwheel. The resultant rotation is transformed into an abundant source of energy adaptable to a wide range of applications.

3 Claims, 39 Drawing Sheets

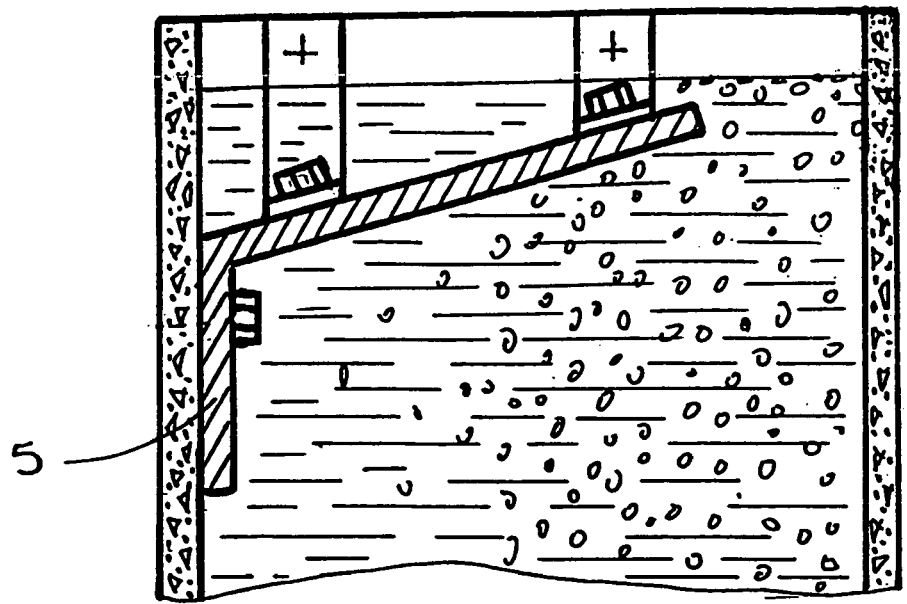
Coupe A-A
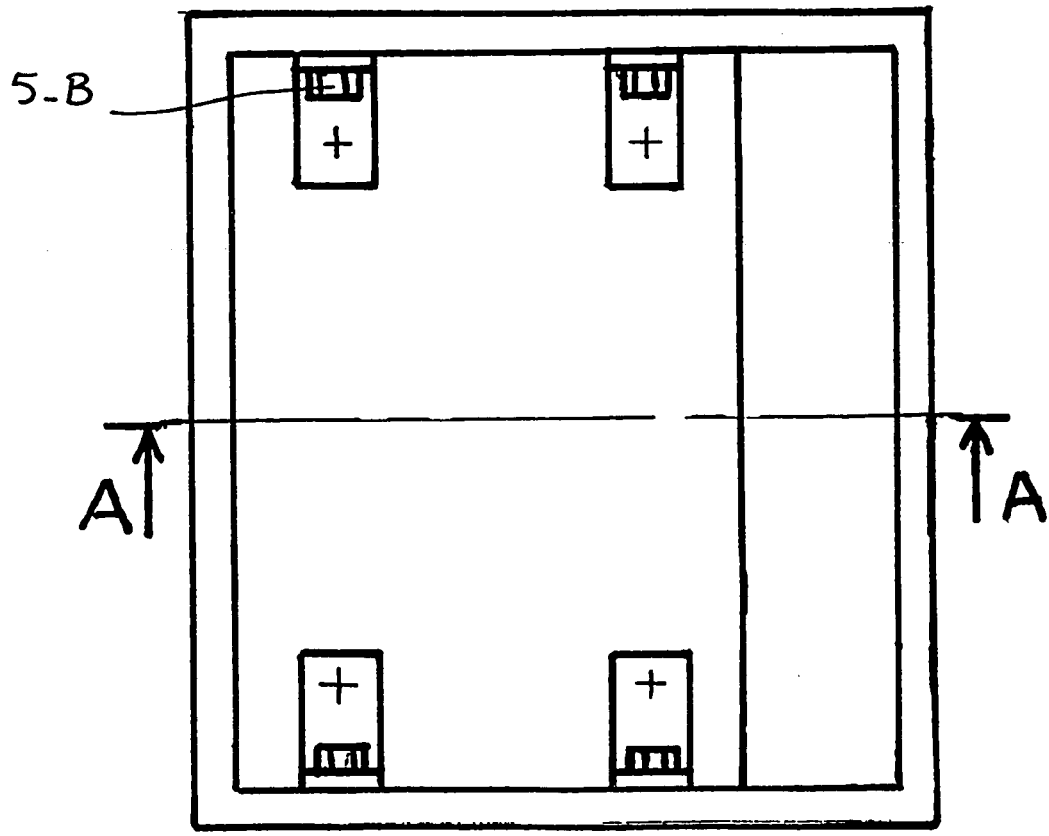
Fig. 2

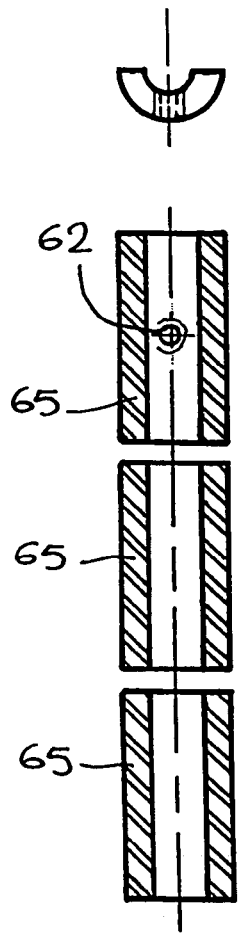
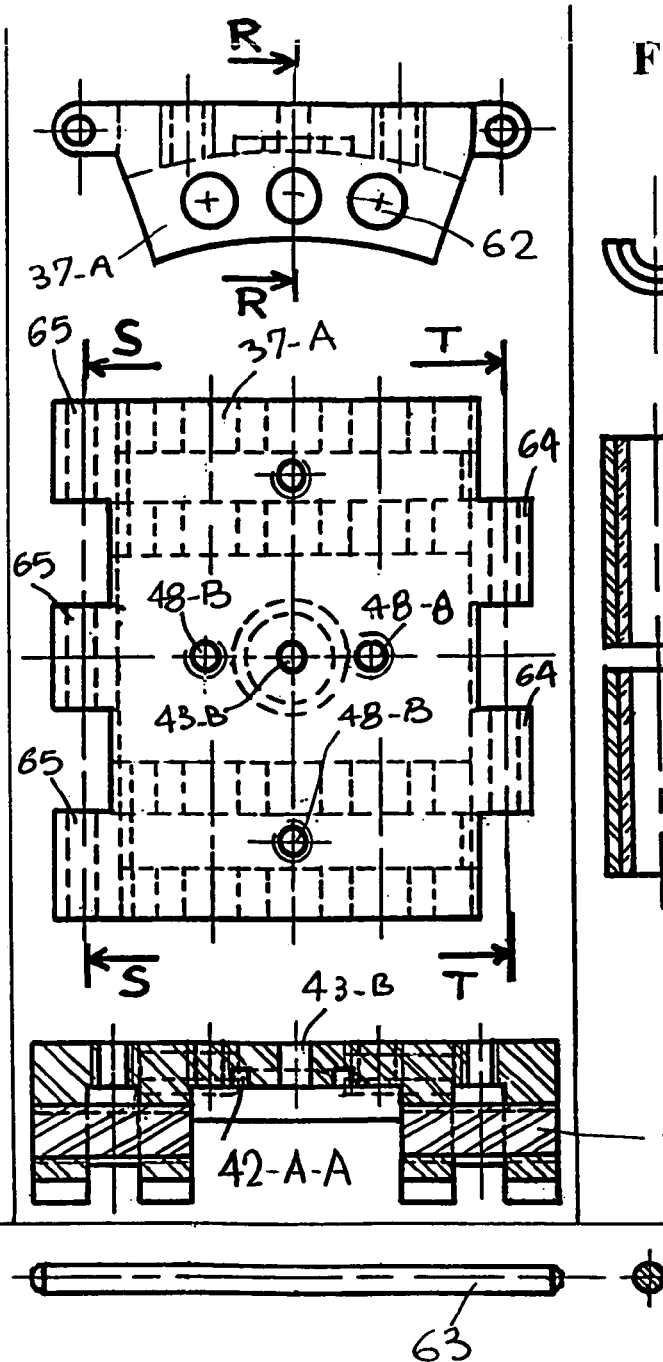
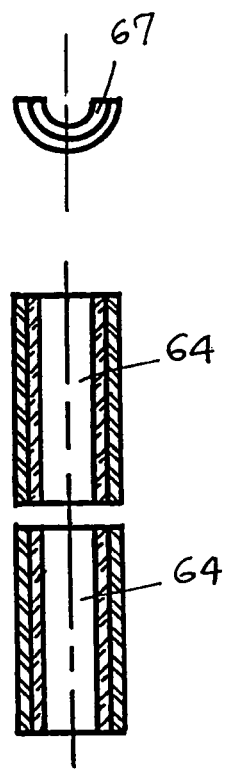
Fig. 17
Fig. 18
Fig. 19
Fig. 20

HYDROELECTRIC POWER PLANT DESIGNED TO TRANSFORM THE POTENTIAL ENERGY OF COMPRESSED GAS INTO MECHANICAL AND ELECTRICAL ENERGY THROUGH THE POTENTIAL ENERGY OF LIQUIDS

This application claims priority of provisional application No. 60/478,619 filed on Jun. 16, 2003.

This invention relates to the construction of a power plant that produces energy using the potential energy of liquids according to Archimedes Principle according to which the buoyant force on a submerged object is equal to the weight of the fluid that is displaced by the object.

The prior art includes machine-like power generators built according to conventional methods. These generators consume conventional energy, the cost of which is steadily rising. Some of this energy is non-renewable and in decline. Many conventional power generators are a major source of pollution and greenhouse gases. They are often plagued by high operating temperatures which result in lost energy.

The subject of this invention eliminates all of the disadvantages of conventional power generators while ensuring ease of operation and an ecological process that uses non-polluting, renewable energy. The invention has the capacity to be located anywhere in the world including cities, remote areas, mountains or deserts.

The embodiment of this invention includes the following:

a pool of liquid that is as deep as possible in order to produce maximum energy, the distance between the shafts of the upper and lower cogwheels being a key factor;

an upper cogwheel placed just below the surface of the pool rotating in two ball bearing housings attached to the walls of the pool so as to allow the output shaft to pass through the walls without leakage; and a lower cogwheel placed in the bottom of the pool rotating in two multi-purpose ball bearings to facilitate rotation and eliminate axial movements. The ball bearing housings are fastened to the frame of a tensioning device that allows adjustment of the tension of the endless chain. The chain is composed of special links that loop around the upper and lower cogwheels, thereby rotating them. The inner surface of the chain link conforms exactly to the outer surface of the lower cogwheel, thus ensuring a good seal between each chain link and the lower cogwheel. Compressed air from the main tank is forced without leakage into containers as they loop around the lower cogwheel from the lower horizontal to the ascending vertical positions. The rotation of the power plant can be either clockwise or counter clockwise. In the design described herein, the rotation is counter clockwise.

Cylindrical containers are fastened to the chain links. Each container has a half cover designed to enhance the buoyant cycle by allowing the compressed air to be injected into it as soon as it comes into the horizontal position on the lower cogwheel. The half cover prevents loss of air until the container advances to an inclined position. Because the injection hole is near the opening of the container, a deflector is used to divert the compressed air toward the closed end of the container to prevent spilling.

The air stops flowing into the container just before it begins its ascent toward the upper cogwheel pushed by the buoyant force of the liquid's potential energy. A bevelled opening under the half cover of each container and a protrusion on the exterior of the closed end of the following container fit snugly together. Any rattling due to hard contact between the two containers is eliminated by means of a rubber seal around the protrusion. Several holes near the opening of each container allow liquid to flow out of the container as the compressed air expands gradually during the container's ascent toward the surface. By the time it reaches the upper cogwheel, the container is full of air. The expanding volume of compressed air in each ascending container displaces an equal volume of liquid. The increasing weight of displaced liquid is the cause of the growing buoyancy. Force is equal to the weight of the liquid displaced by the compressed air.

A guiding device fastened to the wall of the pool ensures that the endless chain and its containers travel smoothly in a straight line without whipping or vibrations. The guiding device is essential for the proper functioning of the power plant and, if needed, can also be installed on the descending side of the chain on which the containers are full of liquid.

After the container arrives on the upper cogwheel, it inclines, emptying its air as it passes over the cogwheel. Simultaneously, liquid floods the container by gravity until it reaches the descending vertical position, at which point its opening is facing directly upward. As the container begins its descent toward the lower cogwheel, it is full of water.

The endless chain provides continuous output to the drive shaft attached to the upper cogwheel as long as the correct quantity of compressed air is injected into each ascending container.

A flywheel attached to one side of the drive shaft ensures that the power plant has continuous and uniform rotation.

On the other side of the drive shaft, a Foucault current electromagnetic brake combined with a gear box regulates the rotation speed as required. Coupling sleeves and sections of shafts can be used to extend the drive shaft to the electrical generator, or any other device desired to be driven by the power plant.

The drive shaft rotates in multi-purpose ball bearings situated by the flywheel on one side and the gear box on the other to facilitate rotation and eliminate axial movements.

A lubricating system lubricates moving parts as required. As lubrication occurs in the pool, it is probable that some lubricant will mix with the liquid. To remove the lubricant from the liquid, a half cover is installed just below the surface of the pool. This calms the turbulence caused by the compressed air exiting the ascending containers and allows the lubricant to be captured by a centrifugal separator and then eliminated.

If the rotation of the endless chain and the containers in the liquid of the pool causes overheating, a radiator can be installed to cool the liquid.

The compressed air injected into the containers with thrust comes from a main tank supplied by one or more of the following:

a) Taylor hydraulic air compressors, popular in the mining industry until approximately 1986: U.S. Pat. Nos. 543,410, 543,311, 543,312, 618,243, and 892,772;

b) ocean wave air compressors: Canadian Patent No. 541393;

c) conventional air compressors using part of the energy produced by the same power plant or by another one.

If required, a secondary air compressor powered by combustion engines or by other means can be used to start the power plant, possibly assisted by a starter.

Depending on the situation, the pool can be emptied by gravity or by a hydraulic pump when it is necessary to do maintenance on the components of the power plant situated in the pool.

In addition to the main elements described above, the power plant includes the electric, electronic, mechanical and hydraulic systems required for its proper functioning.

Other Aspects of this Invention:

1. For greater energy output, the embodiment can be modified as follows:

A. If there is insufficient time to inject enough compressed air between the lower horizontal and the ascending vertical positions, the milled groove in the stationary part of the rotary transfer joint may be machined to enhance the injection of compressed air into descending containers before they reach the lower horizontal position as long as the compressed air does not leak. The half cover will help prevent this from happening. If this configuration is used, the insignificant effect of negative buoyancy on the descending container is counterbalanced by additional buoyancy on the ascending container located between the lower horizontal and ascending vertical positions on the ascending side. Overall, the cumulative volume of compressed air in all ascending containers has a strongly positive impact on the buoyancy already created by the weight of the liquid displaced by the volume of compressed air injected as previously described between the lower horizontal and ascending vertical positions.

B. A multiple-stage power plant may be designed where the upper cogwheels of all stages power the same drive shaft.

The overall capacity of the power plant is determined by the total buoyant force of all the containers with thrust. This is equal to the weight of the liquid displaced by the total volume of air in the containers with thrust expressed in Newtons, multiplied by the distance between the center of the drive shaft and the center of gravity of each container. This distance is the sum of the radius of the upper cogwheel and the radius of the container expressed in meters, multiplied by 2, multiplied by π (3.1416), multiplied by the number of revolutions per minute (rpm) of the power plant. The result of the foregoing multiplication is divided by 60 to express the power in watts. If it is desired to express this value in horsepower, the power in watts is divided by 746 (each unit of horsepower being equal to approximately 746 watts).

In summary, the main advantage of this invention is that it transforms the potential energy of compressed gases into mechanical, then electrical energy, through the potential energy of liquids. This can be done economically and the invention can be used anywhere.

Given the design flexibility of this power plant, and discounting mechanical problems and regularly scheduled stoppages, this invention represents one possible solution to the challenge of supplying economical, abundant energy without wasting non-renewable resources, creating hazardous nuclear waste, increasing pollution and greenhouse gases, or further damming rivers and flooding land.

Note: All the immersed parts of the power plant must be manufactured using corrosion- and oxidation-resistant materials.

Depending on site specifications and the output required, various components, configurations and dimensions for the embodiment may be combined to achieve the desired results. For a better understanding of this invention and to facilitate its examination, it is represented in the following 45 Figures.

BRIEF DESCRIPTION OF THE DRAWINGS

FIG. 2 is a schematic representation of the opening of the pool of the power plant and a cross-sectional view taken along line A—A of the same Figure.

$$Power = \frac{force \text{ (Newtons)} \times (R \text{ (wheel)} + r \text{ (container) (in meters)}) \times 2 \times \pi \times rpm}{60 \times 746} = horsepower$$

To increase the energy output of the power plant, larger containers and wheels with a greater radius may be used.

2. Instead of using compressed air from the sources described above, gas produced geo-thermally from black smokers in the sea bottom or elsewhere can be collected using cones and pipes, then transferred to the main tank of the power plant.

Alternately, the excess pressure of natural gas can be used. In this case, the pool must be covered so as to avoid leaks. After exiting the containers, the natural gas proceeds normally at an agreed-upon lower pressure.

A Last Aspect of the Invention:

In the case of a very large power plant where the shaft of the generator has to be vertical, a transmission system using conic wheels, or connecting rods and crank handles, can be used to drive the generator.

Figure 10:
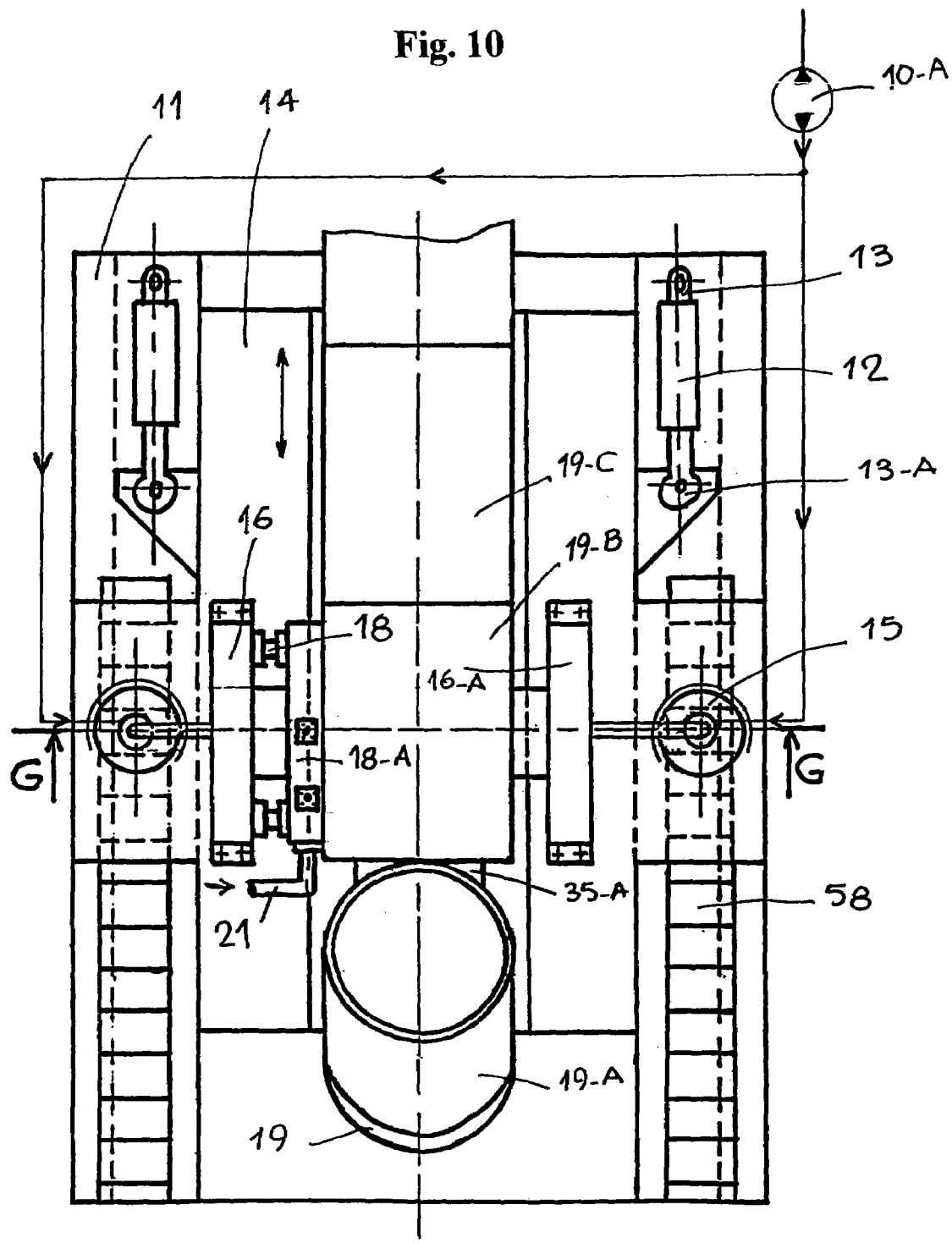

FIG. 10 is a schematic view of the lower cogwheel installed on the frame of the tensioning device that adjusts the tension of the endless chain.

Figure 11:
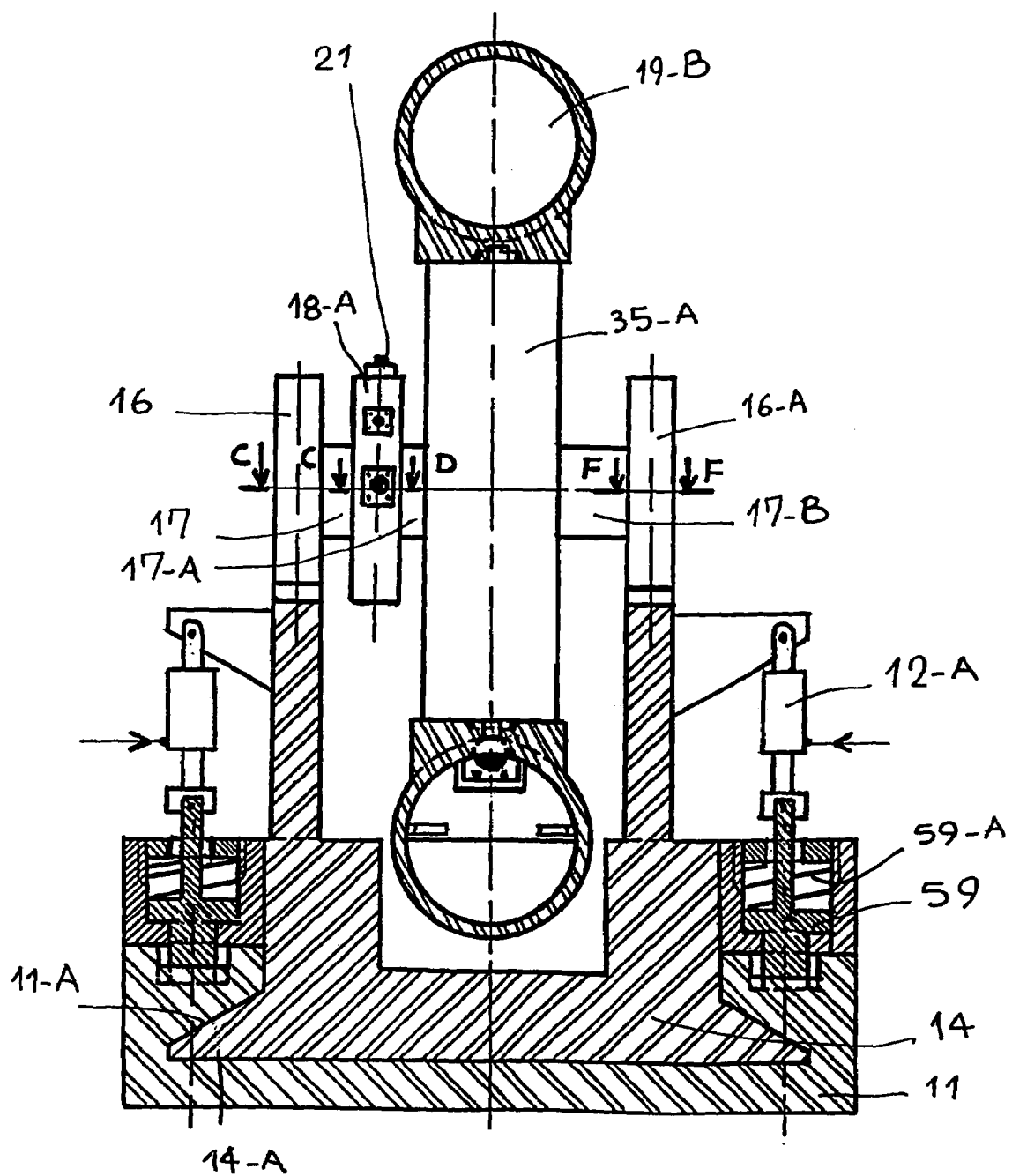

FIG. 11 is a cross-sectional view along line G—G of FIG. 10.

Figure 12:
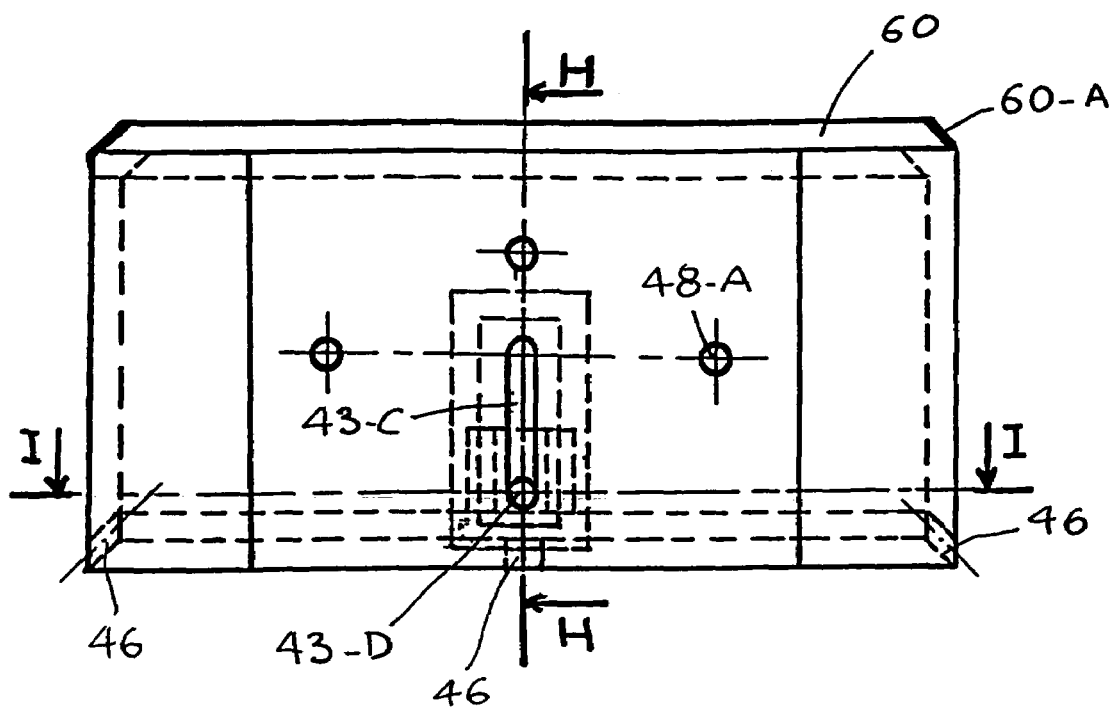

FIG. 12 is the front view of a container.

Figure 13:
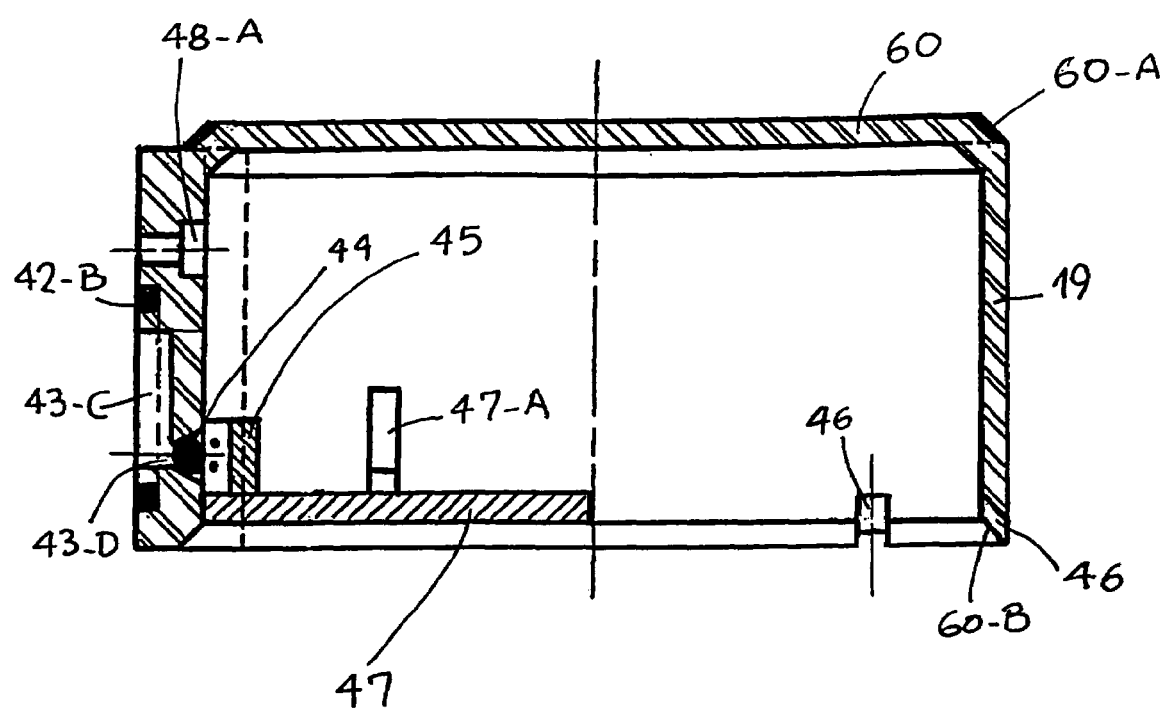

FIG. 13 is a cross-sectional view along line H—H of FIG. 12.

Figure 14:
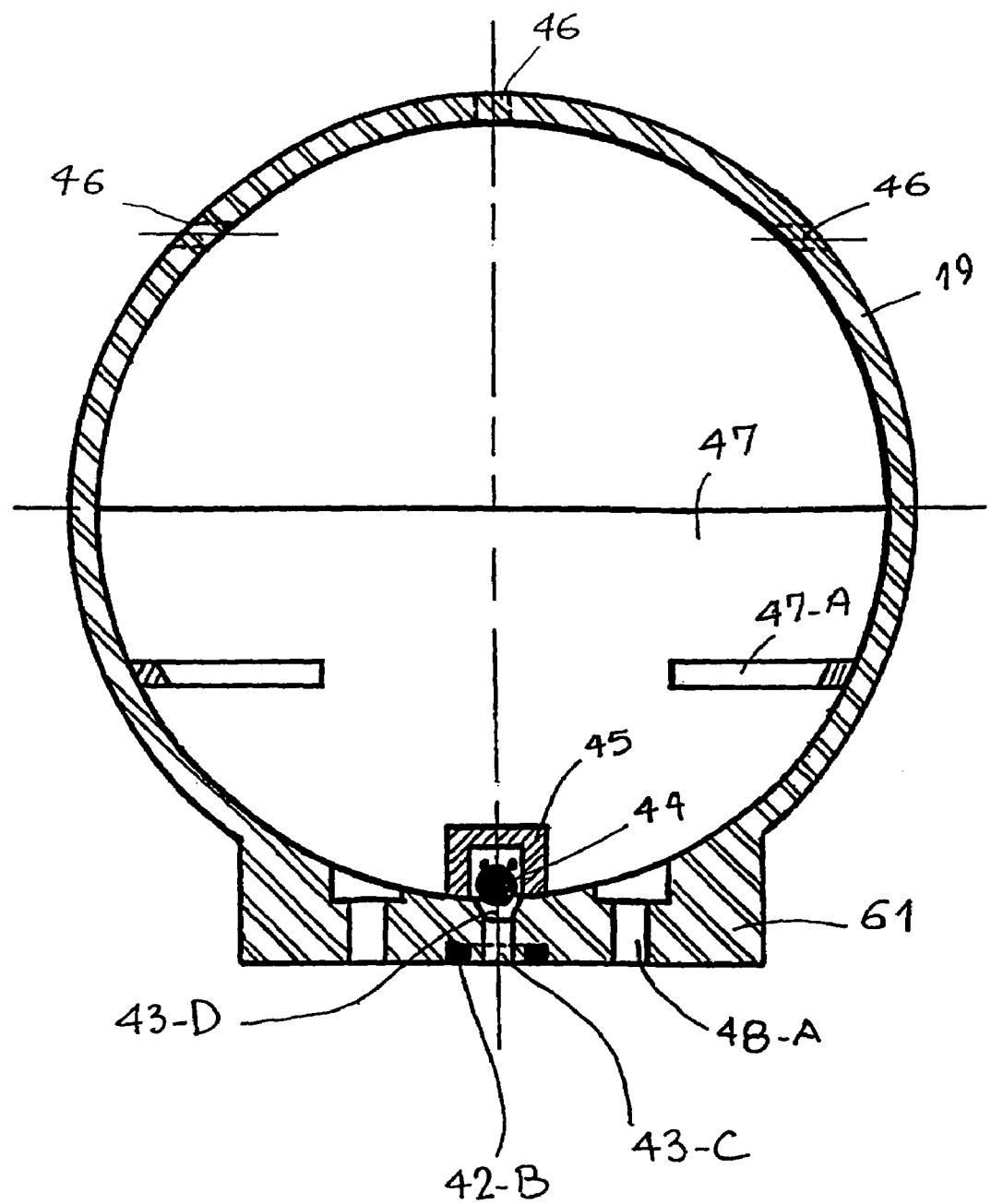

FIG. 14 is a cross-sectional view along line I—I of FIG. 12.

Figure 15:
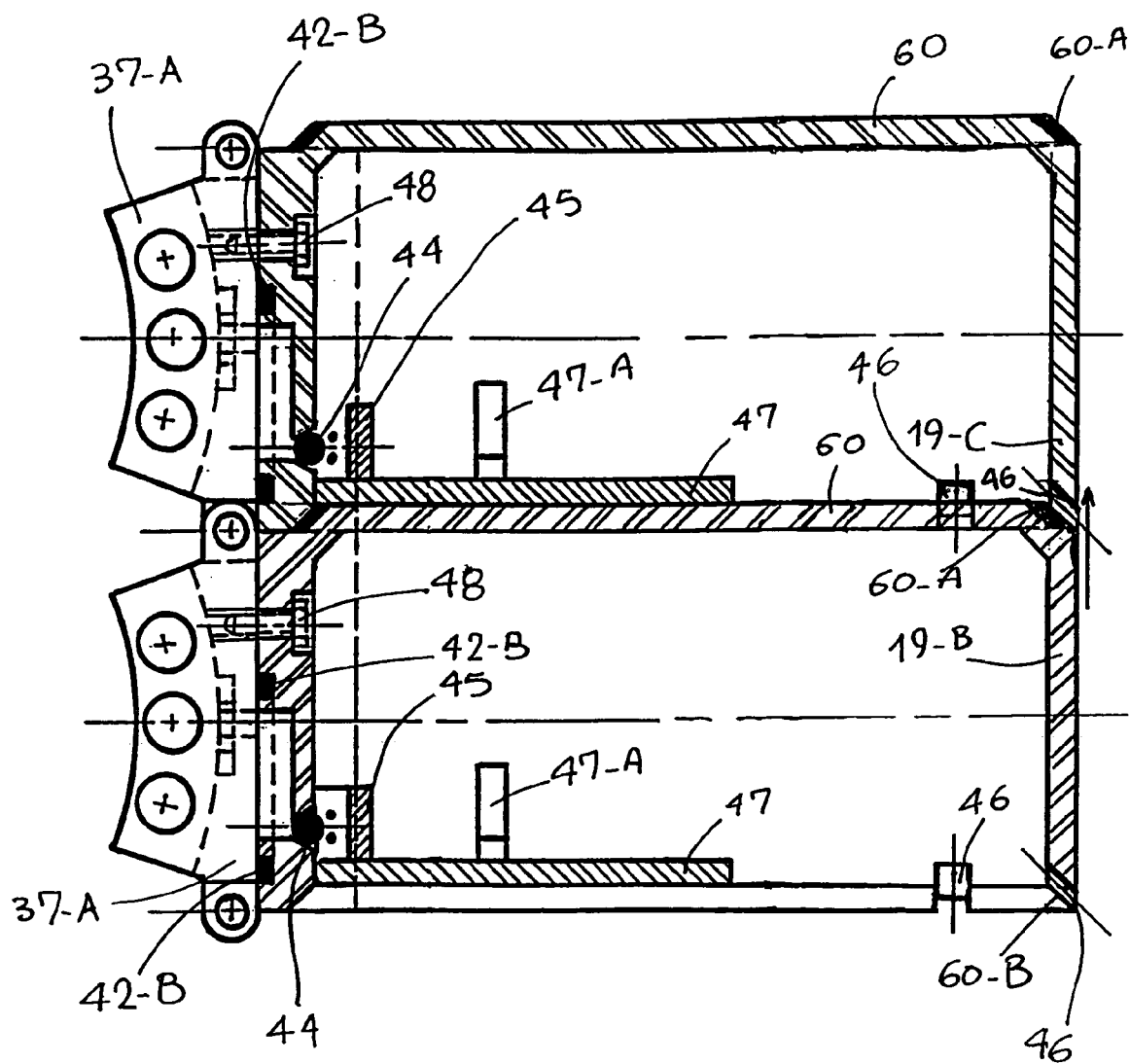

FIG. 15 is a cross-sectional view of two ascending containers.

Figure 16:
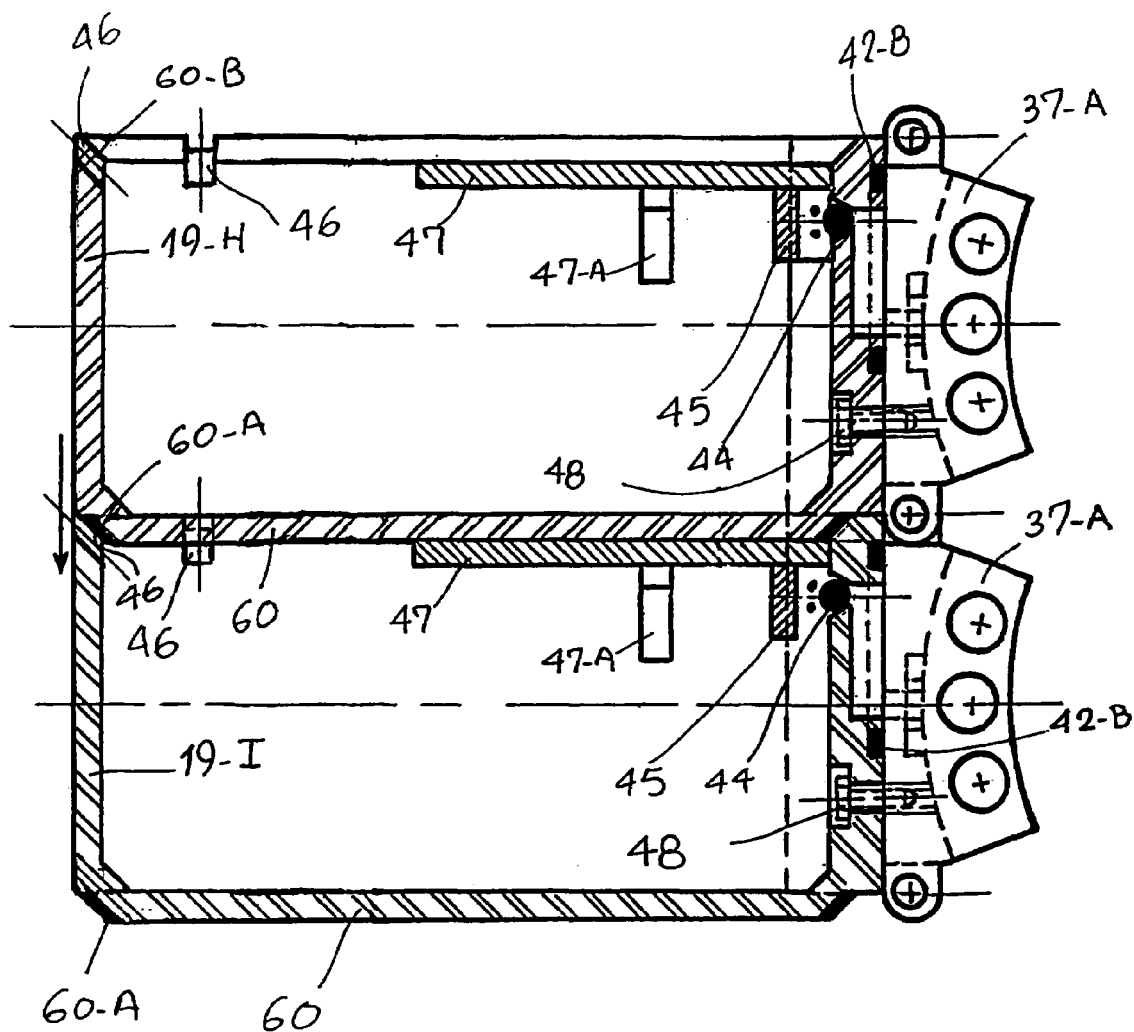

FIG. 16 is a cross-sectional view of two descending containers.

FIG. 17 is a view of a chain link of the endless chain and a cross-sectional view along line R—R.

FIG. 18 is an enlarged cross-sectional view along line T—T of FIG. 17.

FIG. 19 is an enlarged cross-sectional view along line S—S of FIG. 17.

FIG. 20 is a longitudinal view and a radial cross section of a link pin in the endless chain.

Figure 21:
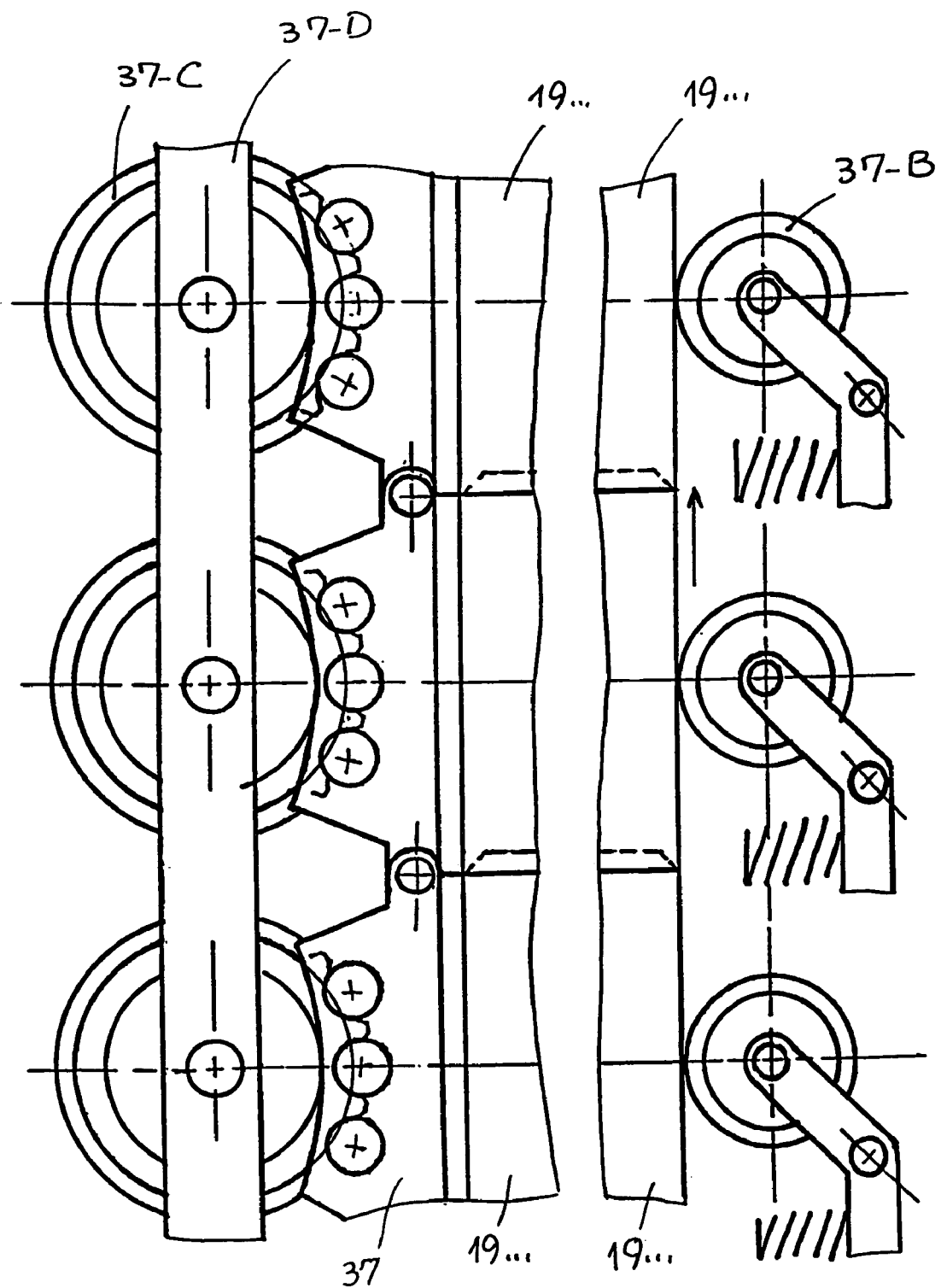

FIG. 21 is a side view of the endless chain with the guiding device.

Figure 3:
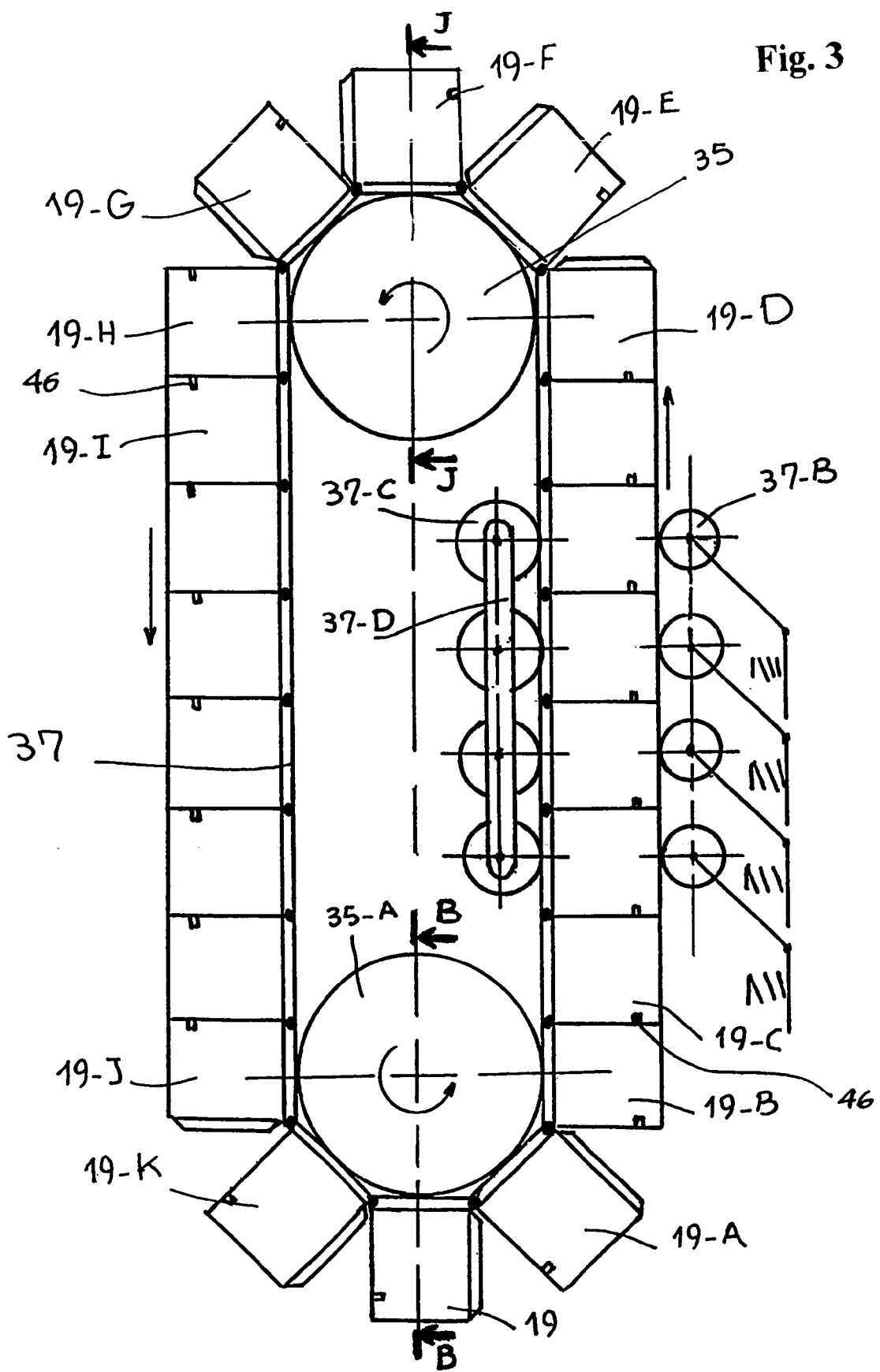
FIG. 3 is a side schematic view of the upper and lower cogwheels and the endless chain with containers.
Figure 22:
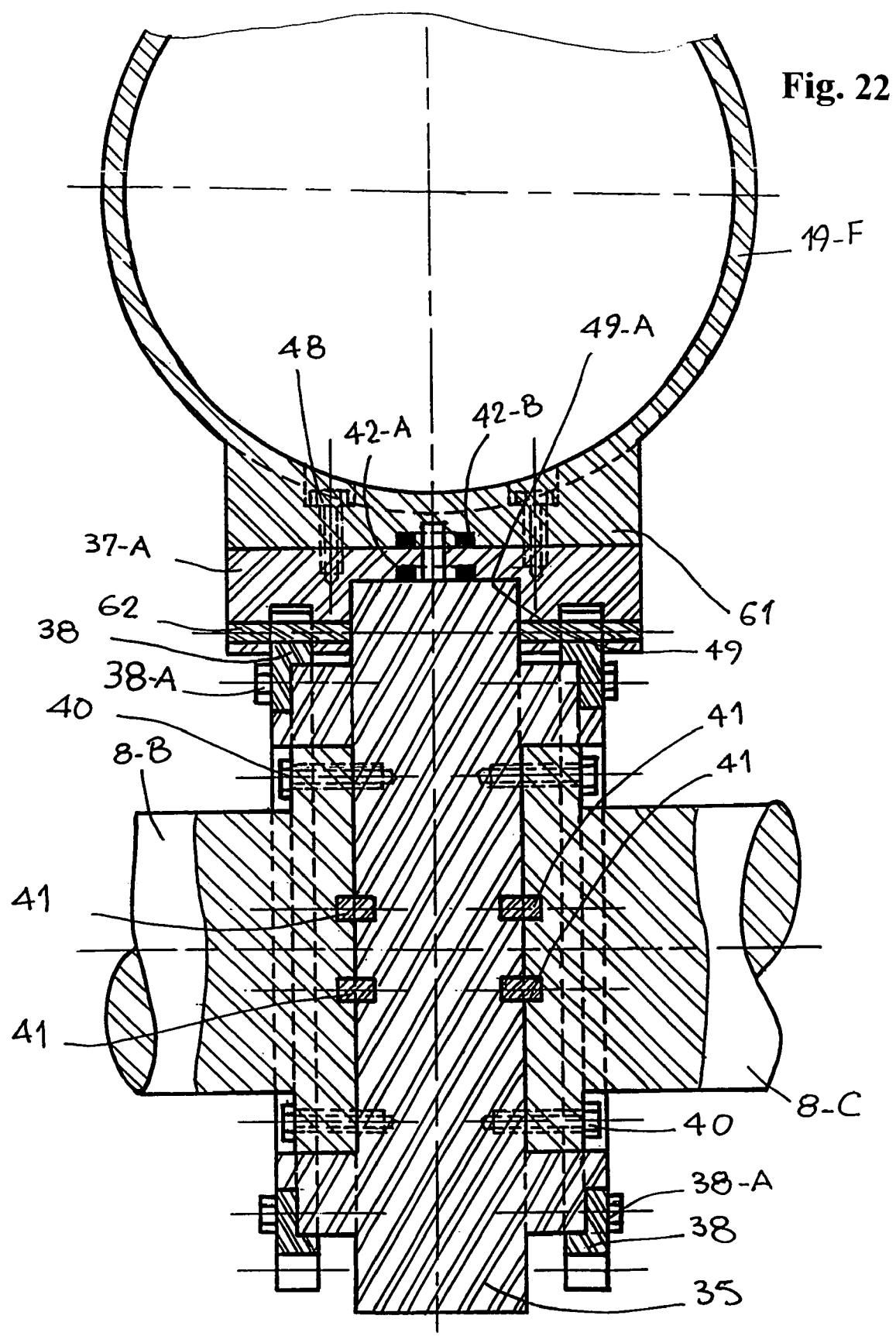

FIG. 22 is a cross-sectional view along line J—J of FIG. 3.

Figure 23:
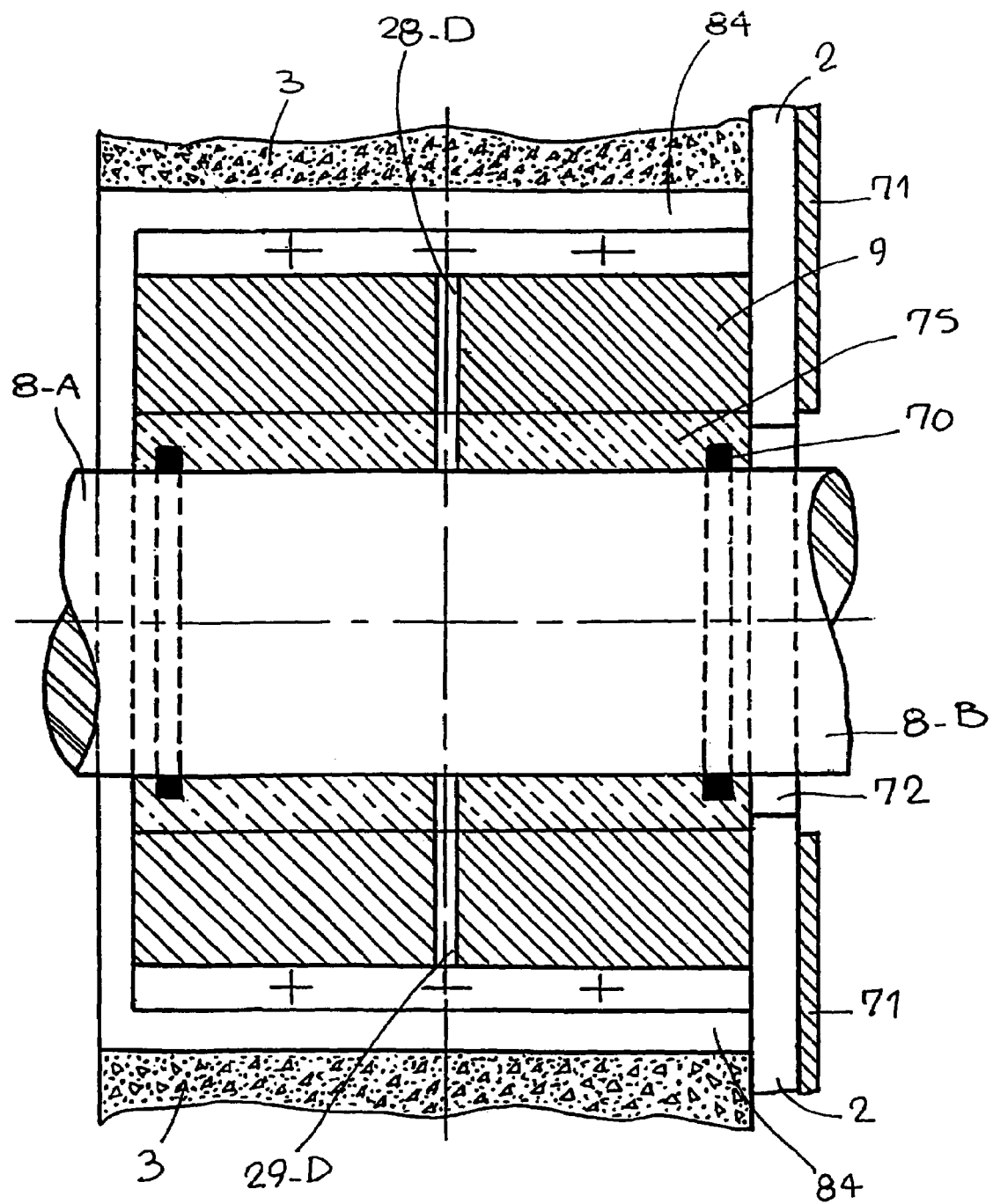
Figure 24:
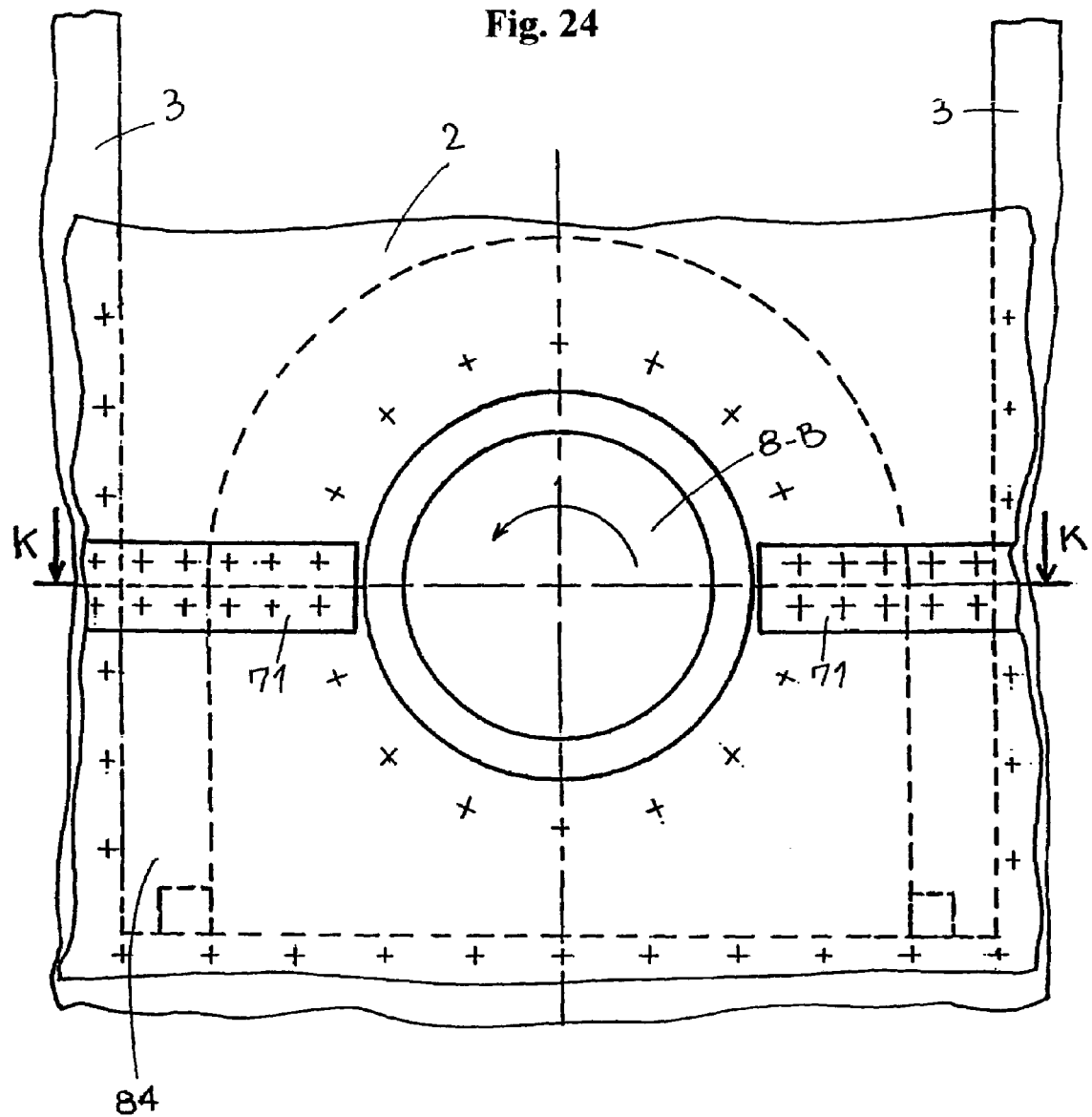

FIG. 23 is a cross-sectional view along line K—K of FIG. 24.

FIG. 24 is a front view of a panel used to seal the pool at the point where the drive shaft exits the pool to the left.

Figure 25:
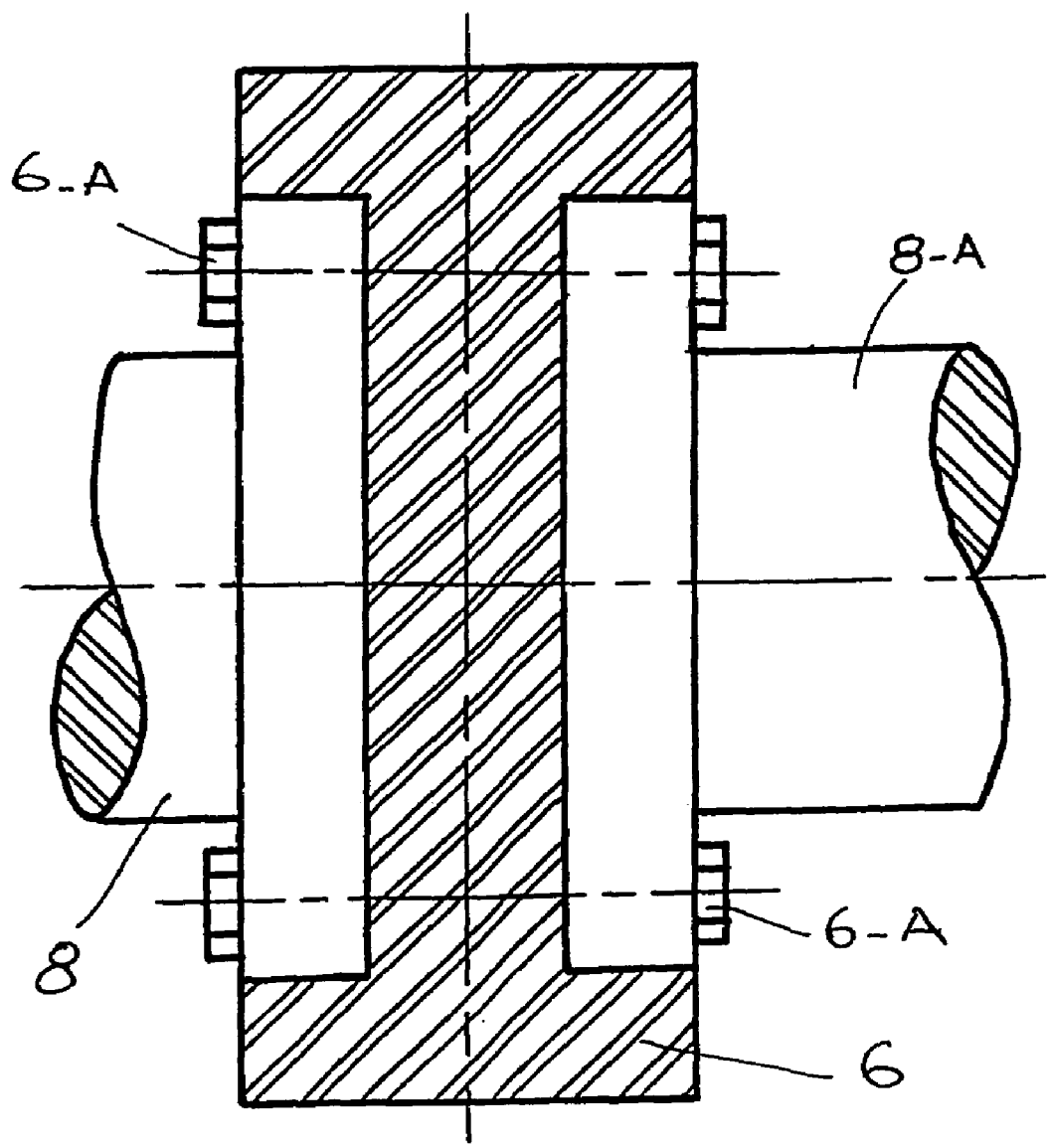
Figure 26:
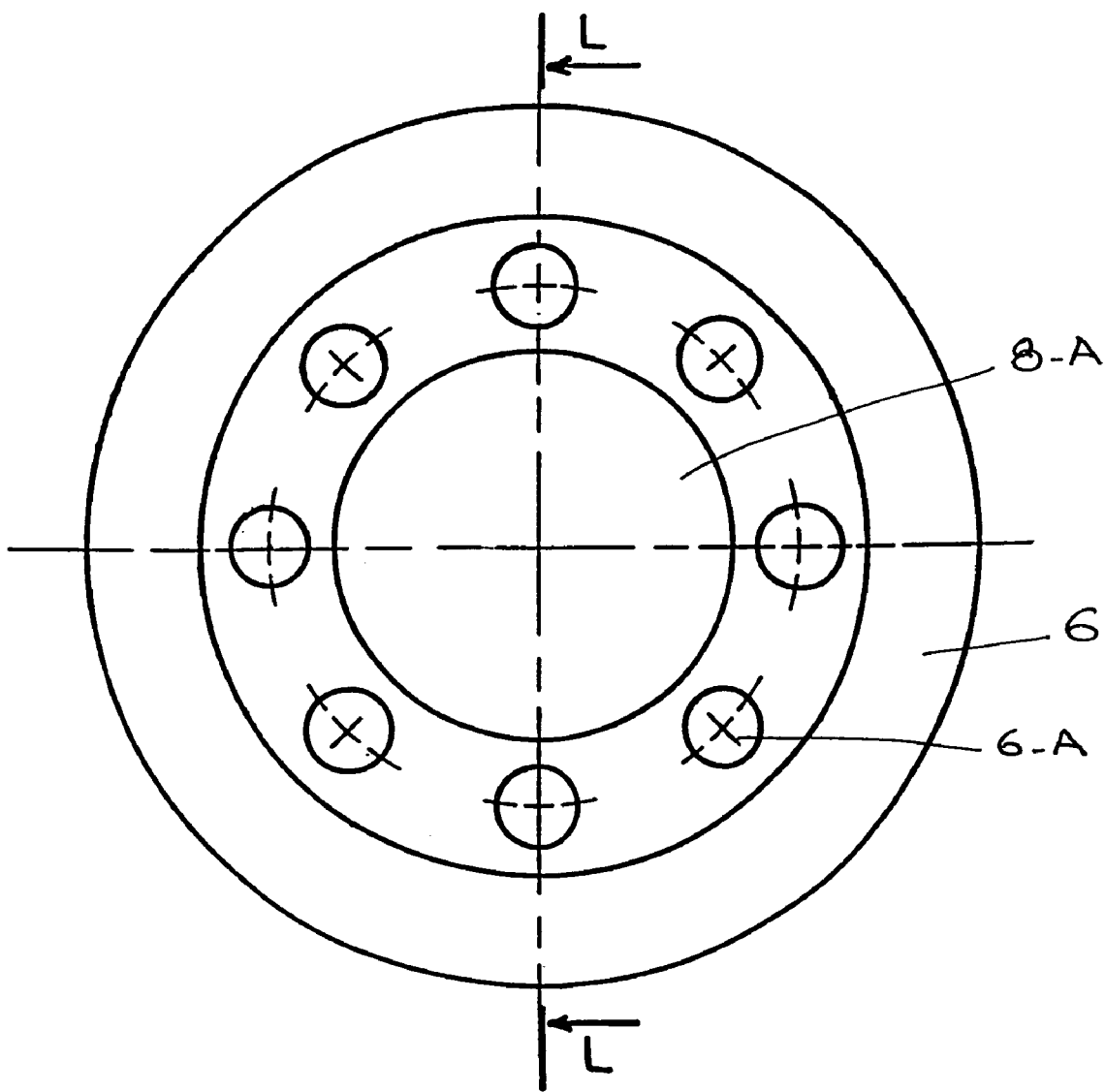

FIG. 25 is a cross-sectional view along line L—L of FIG. 26.

FIG. 26 is a side view of the flywheel.

Figure 27:
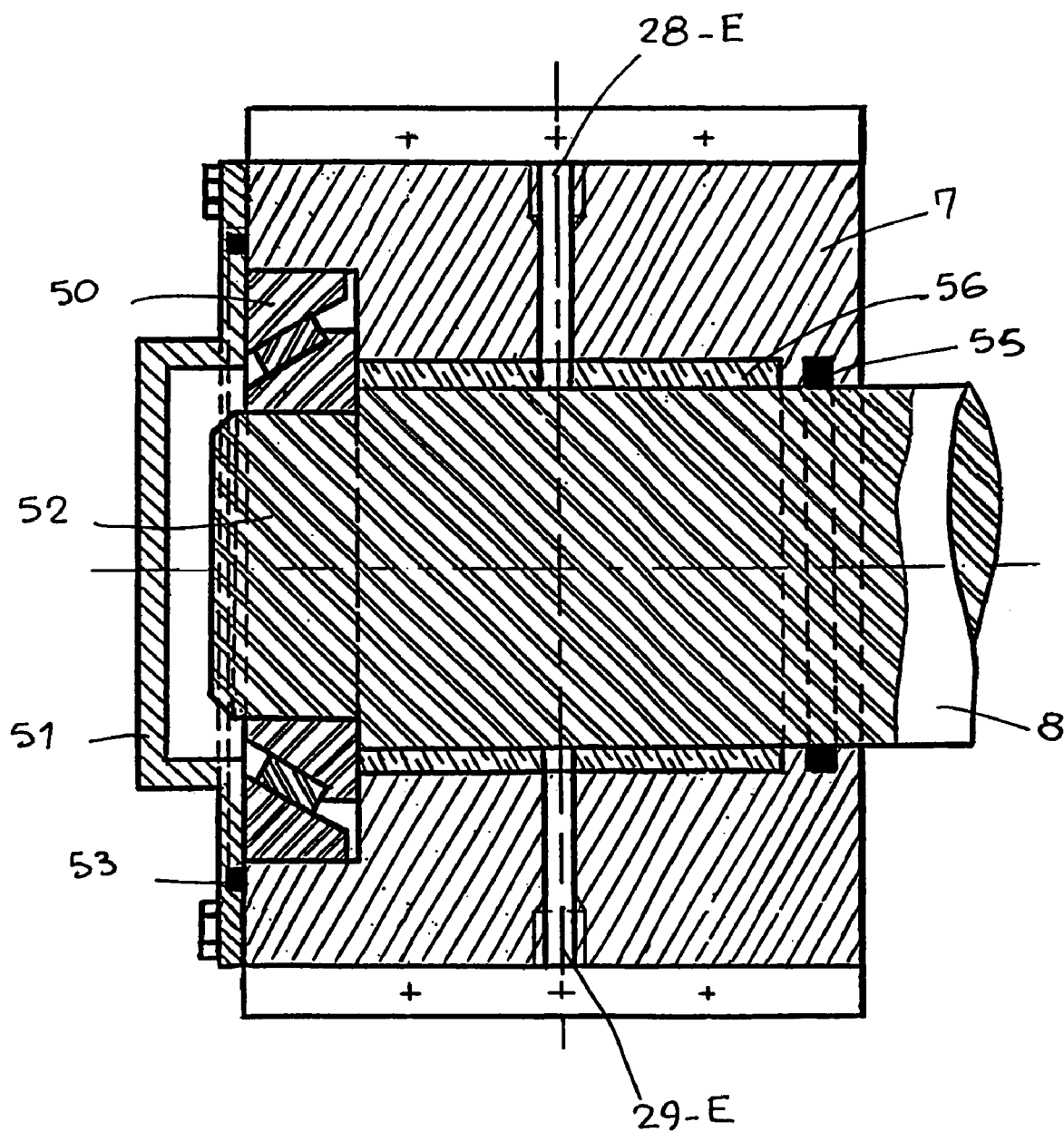

FIG. 27 is a cross-sectional view of the axle bearing and the multi-purpose ball bearing on the left shaft of the flywheel.

Figure 28:
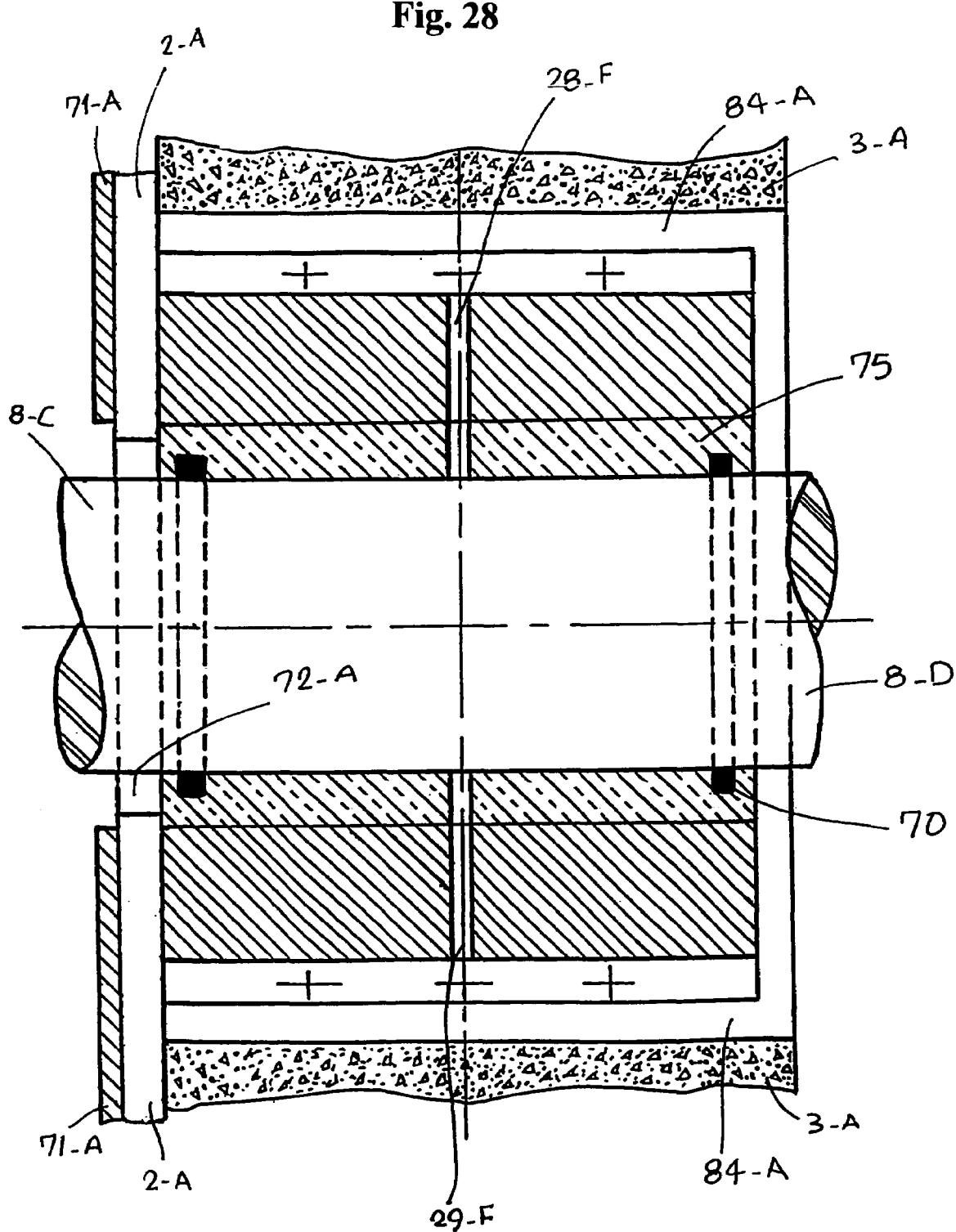
Figure 29:
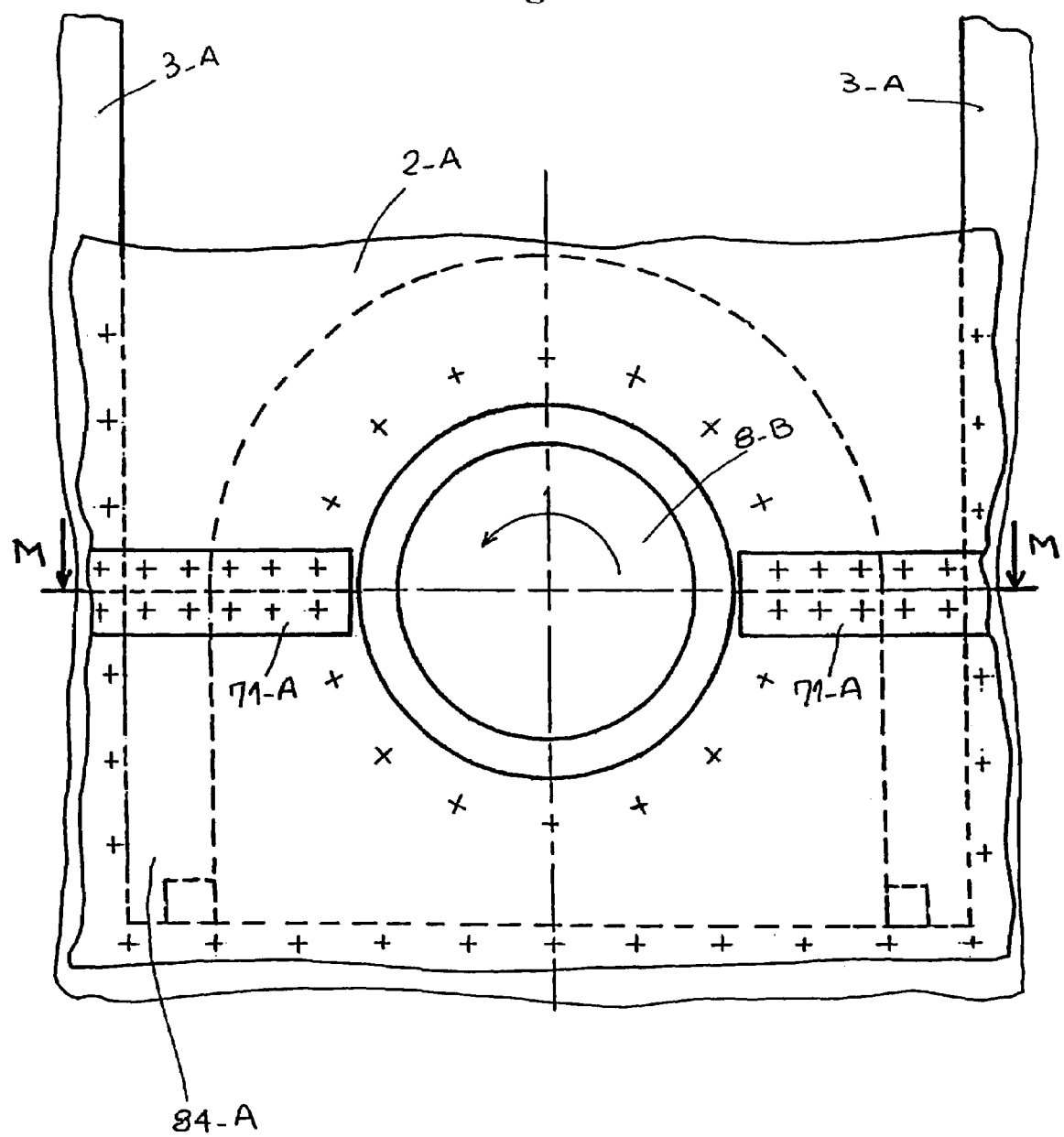

FIG. 28 is a cross-sectional view along line M—M of FIG. 29.

FIG. 29 is a front view of the other panel used to seal the pool where the drive shaft exits the pool to the right.

Figure 30:
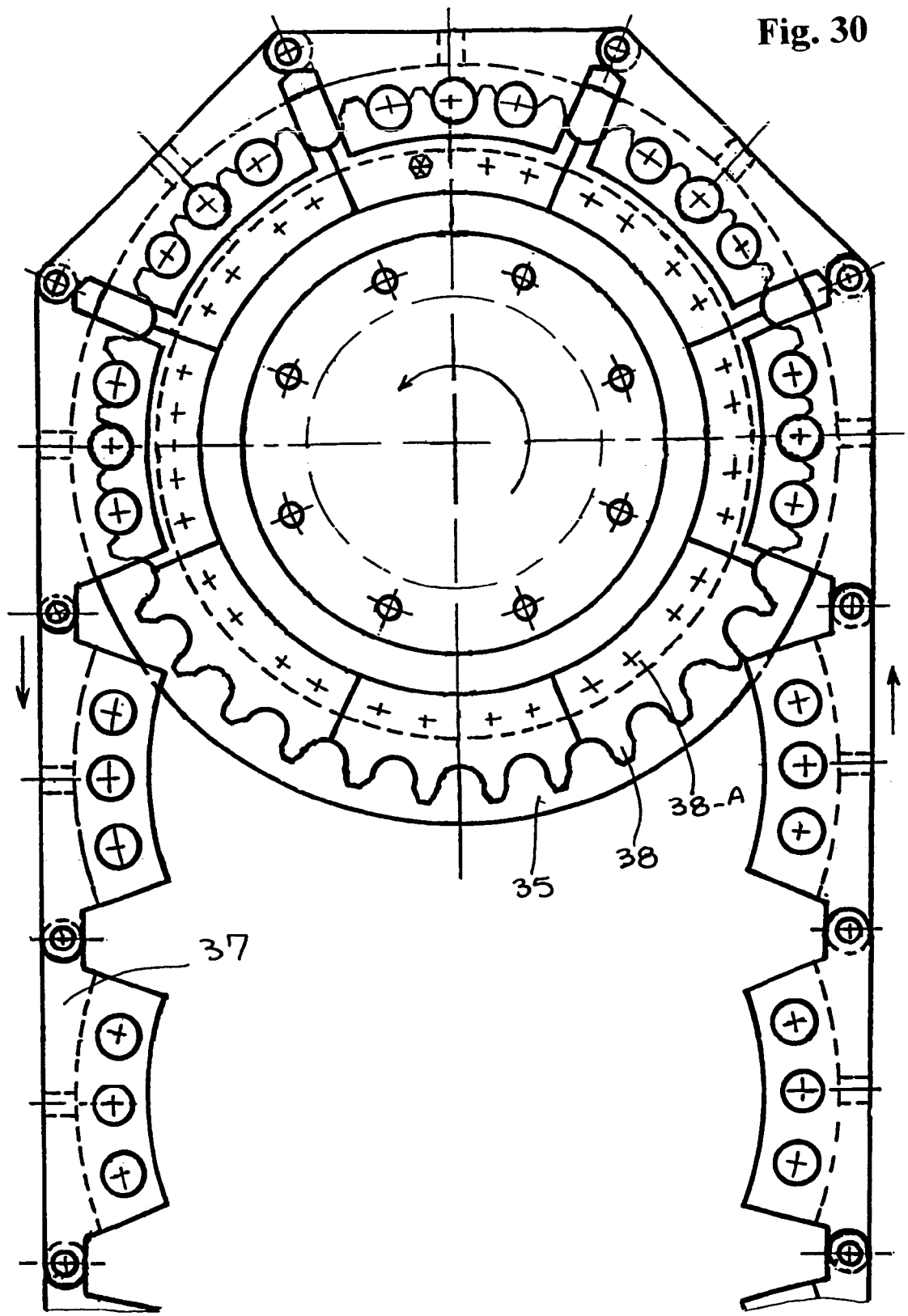

FIG. 30 is a side view of the upper cogwheel and the chain.

Figure 31:
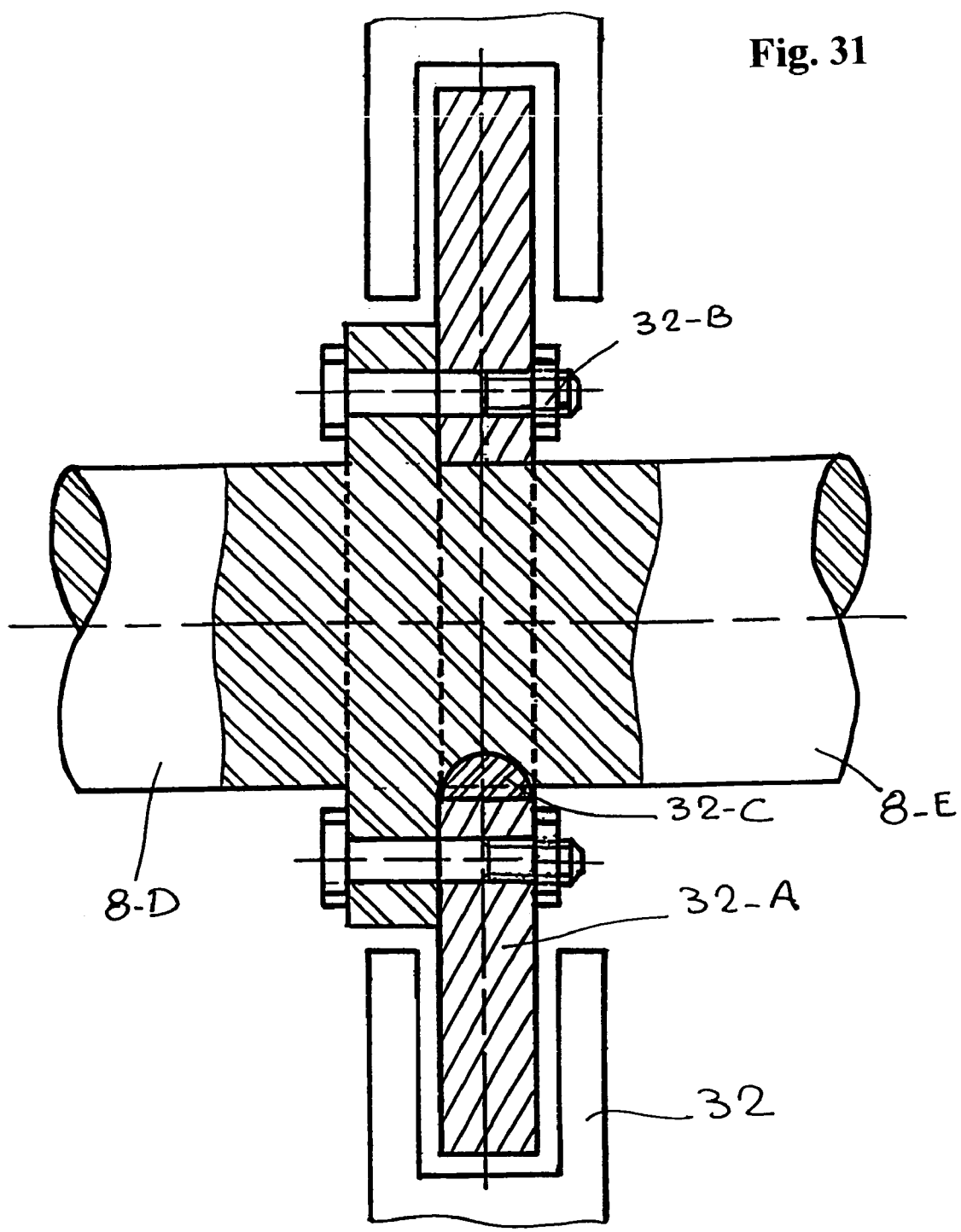

FIG. 31 is a cross-sectional view showing the disk of the Foucault current electromagnetic brake.

Figure 32:
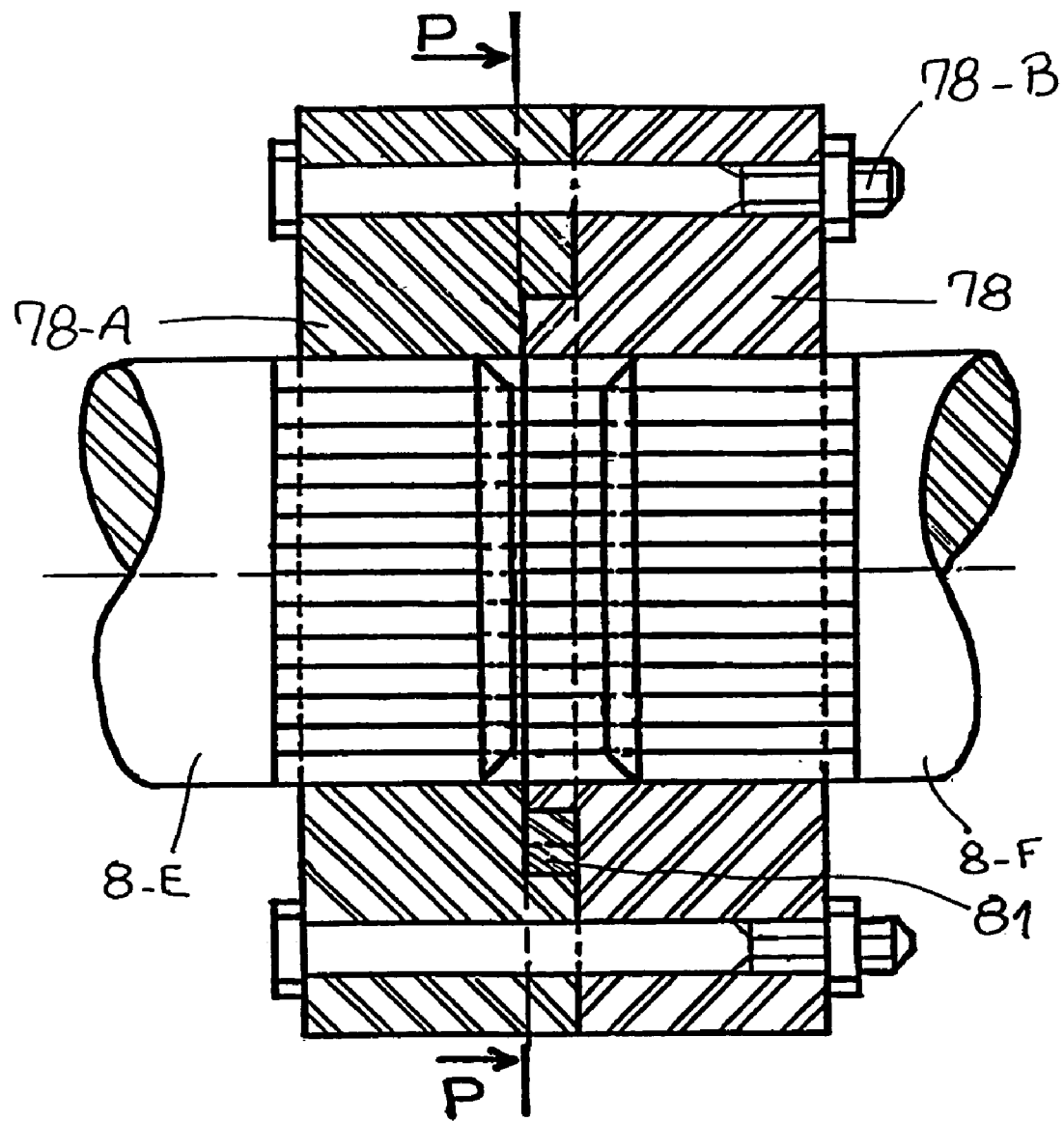
Figure 34:
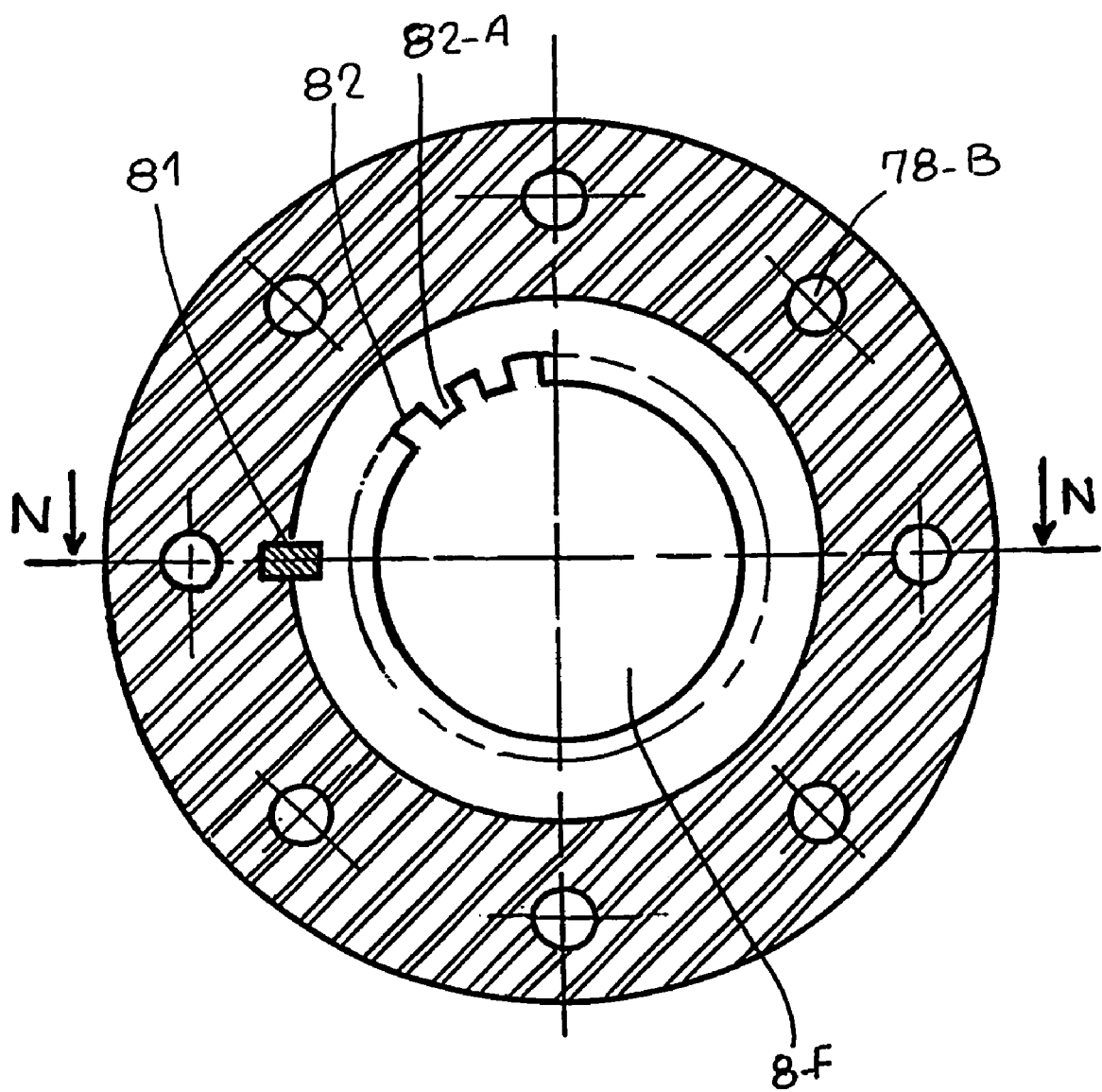
Figure 35:
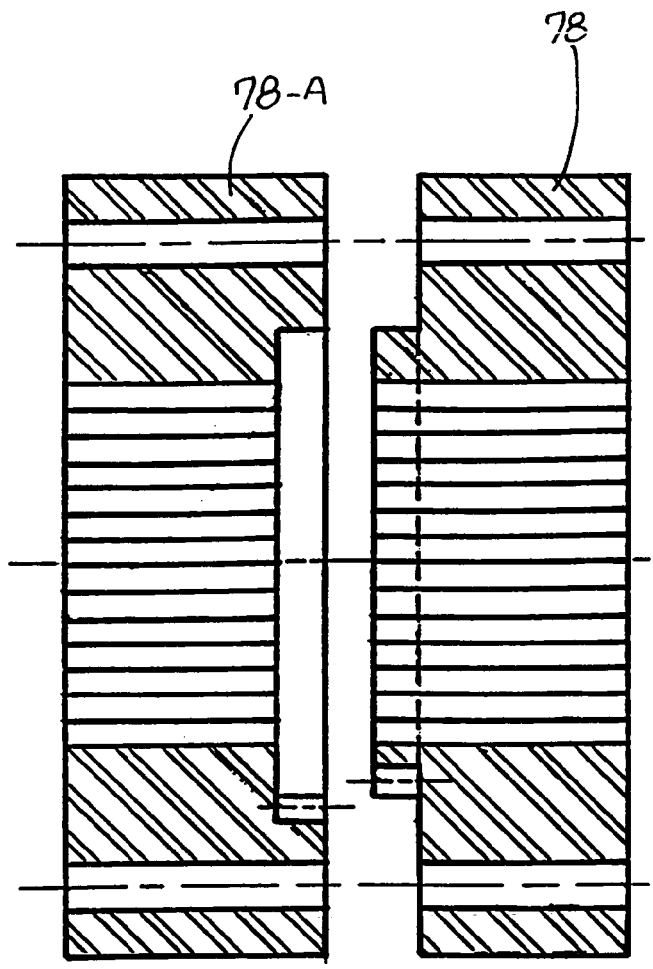
Figure 36:
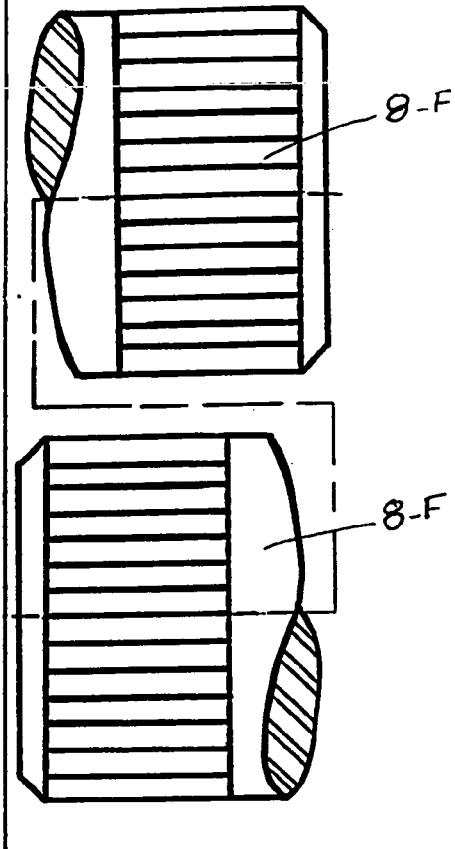
Figure 37:
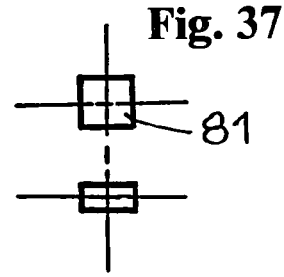
Figure 38:
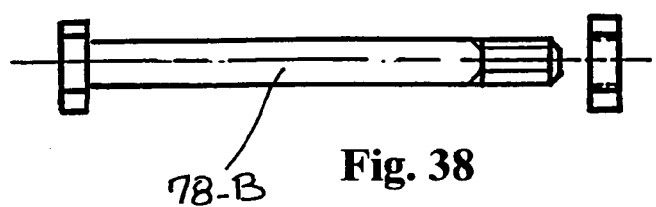

FIG. 32 is a cross-sectional view along line N—N of FIG. 34, left coupling sleeve.

Figure 33:
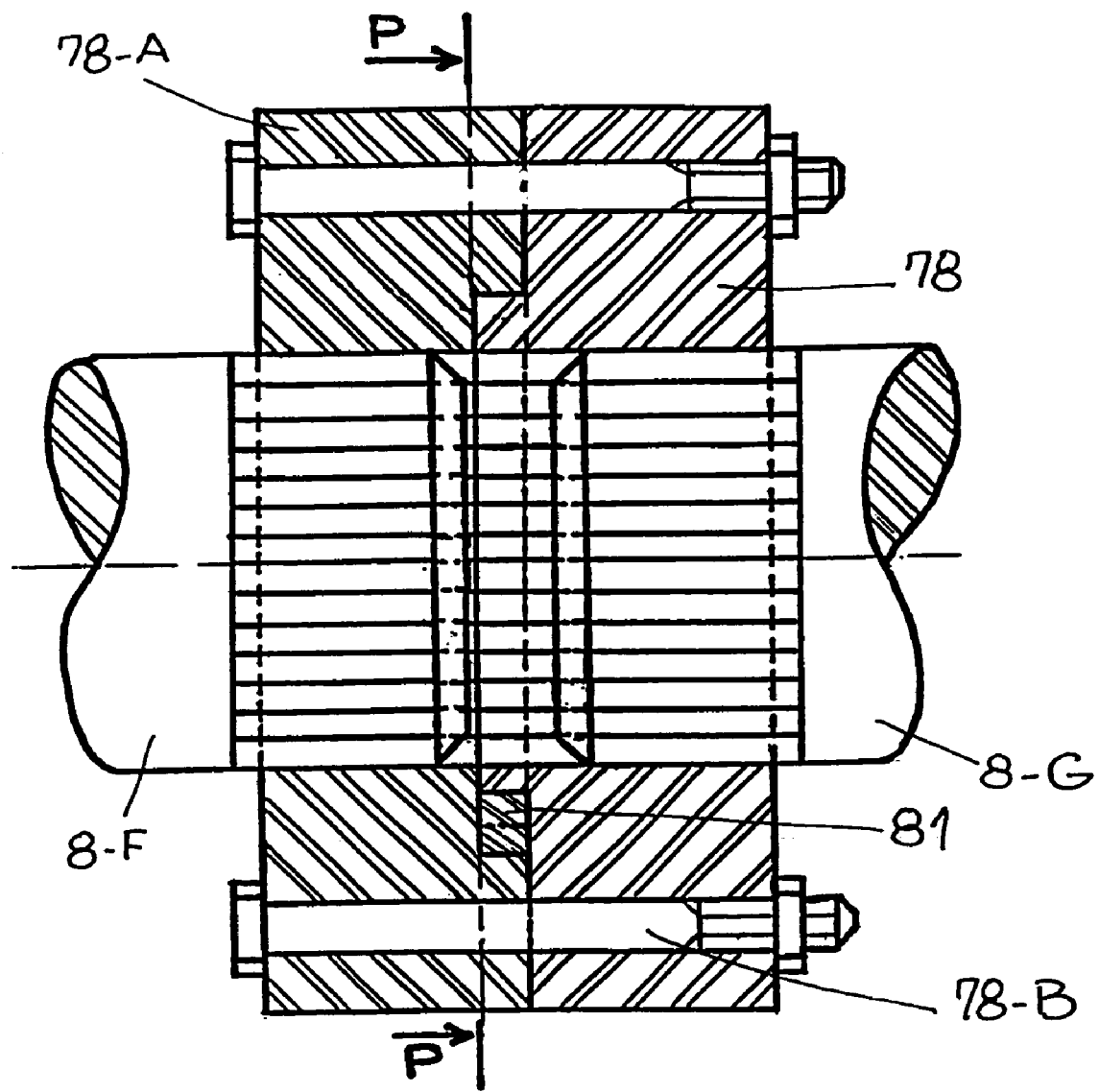

FIG. 33 is a cross-sectional view along line N—N of FIG. 34, right coupling sleeve.

FIG. 34 is a cross-sectional view along line P—P of FIG. 32 or FIG. 33.

FIGS. 35, 36, 37 and 38 are detailed views of the components of the device used to lengthen the drive shaft of the power plant if required.

Figure 39:
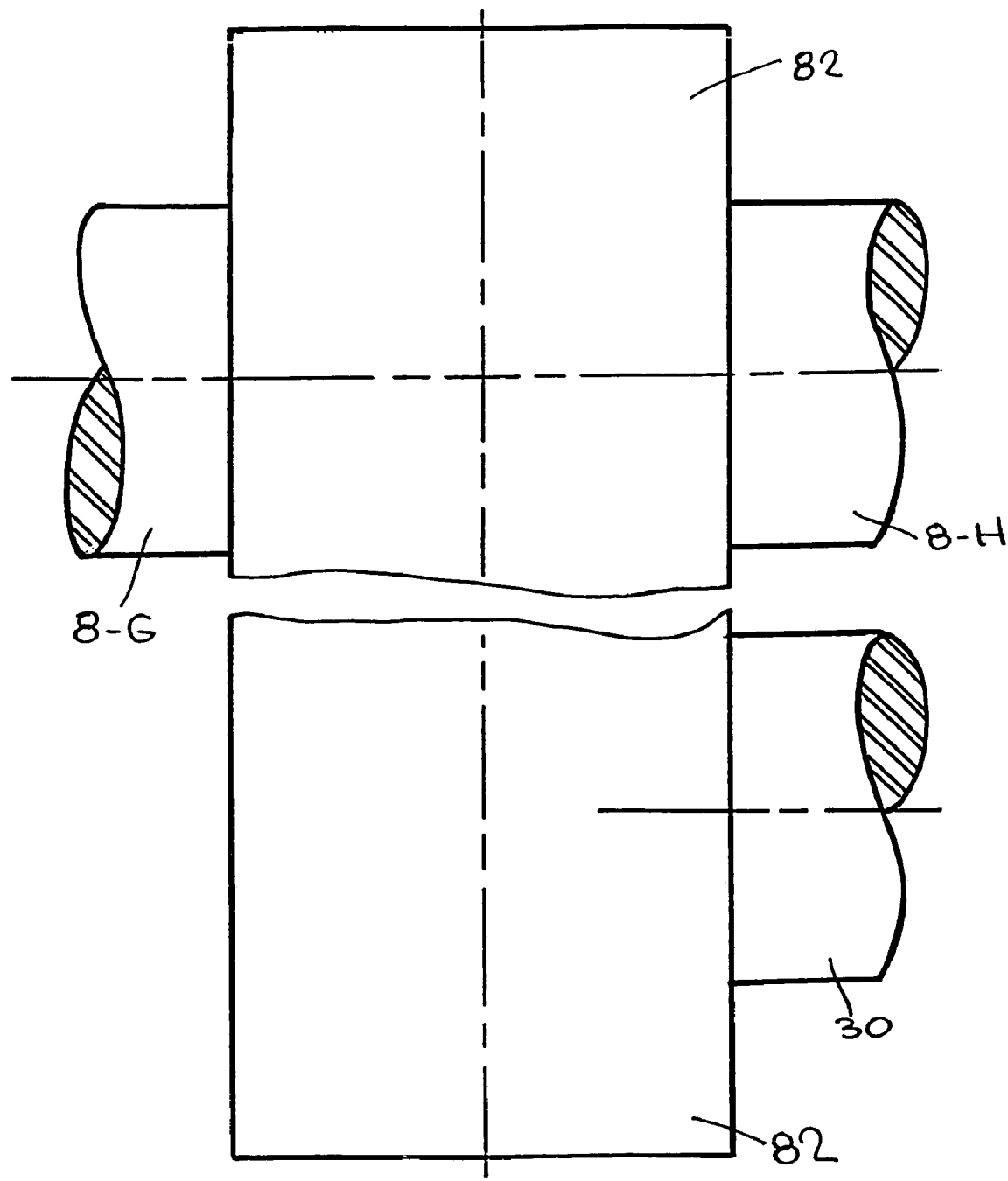

FIG. 39 is a schematic view of the gear box.

Figure 40:
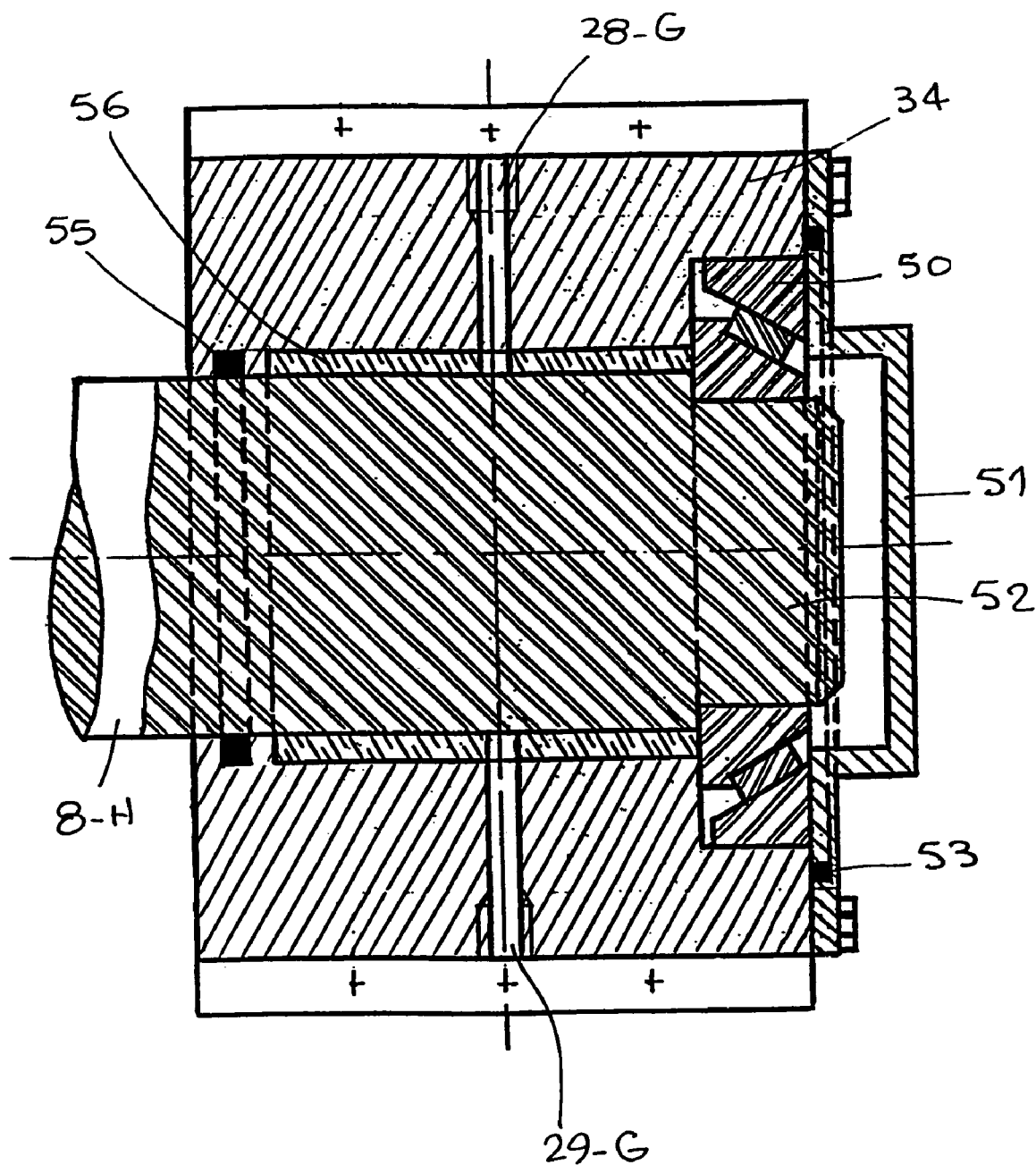

FIG. 40 is a cross-sectional view of the axle bearing and the multi-purpose ball bearing of the drive shaft beside the gear box.

Figure 41:
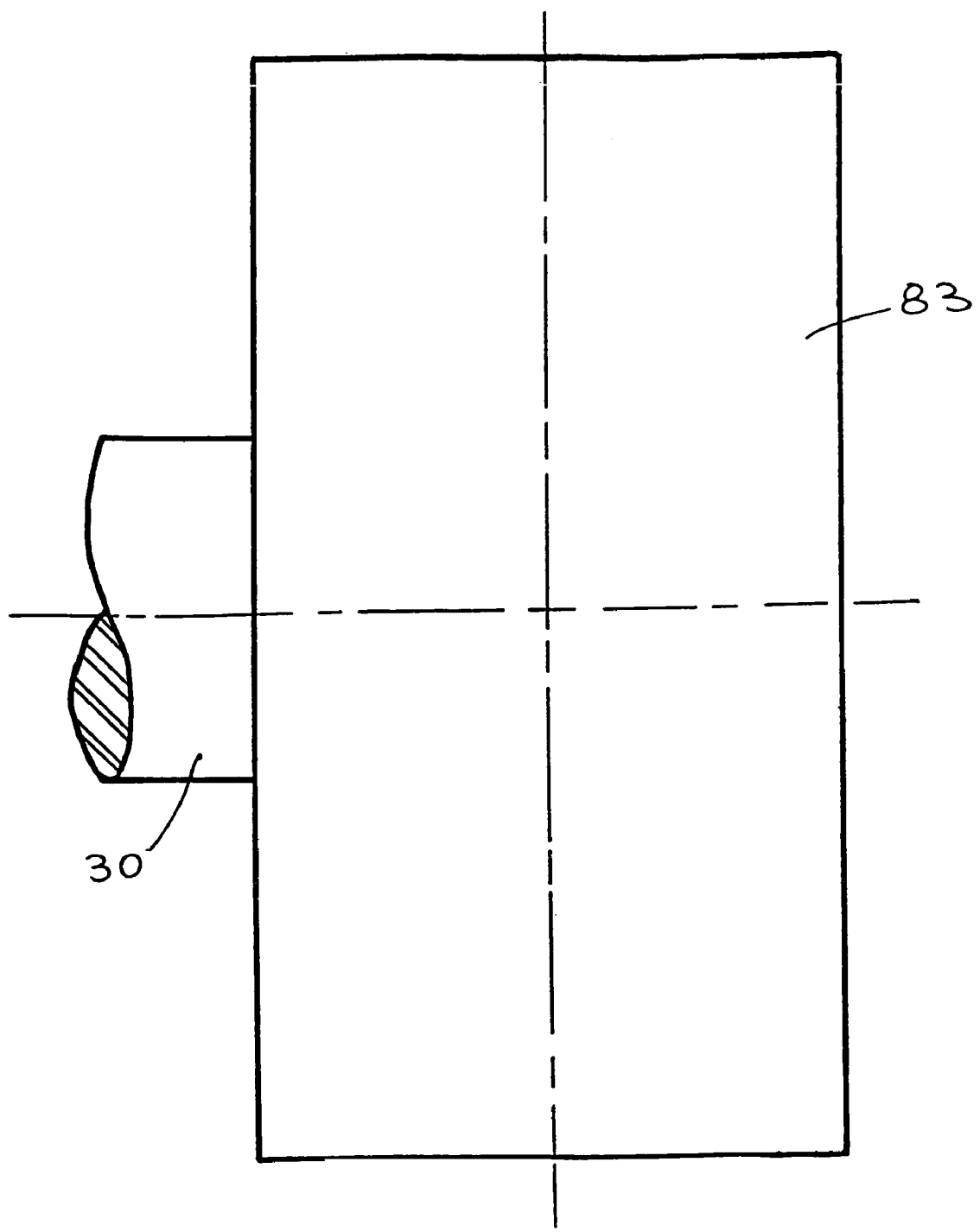

FIG. 41 is a schematic view of the drive shaft connected to an electrical generator.

Figure 42:
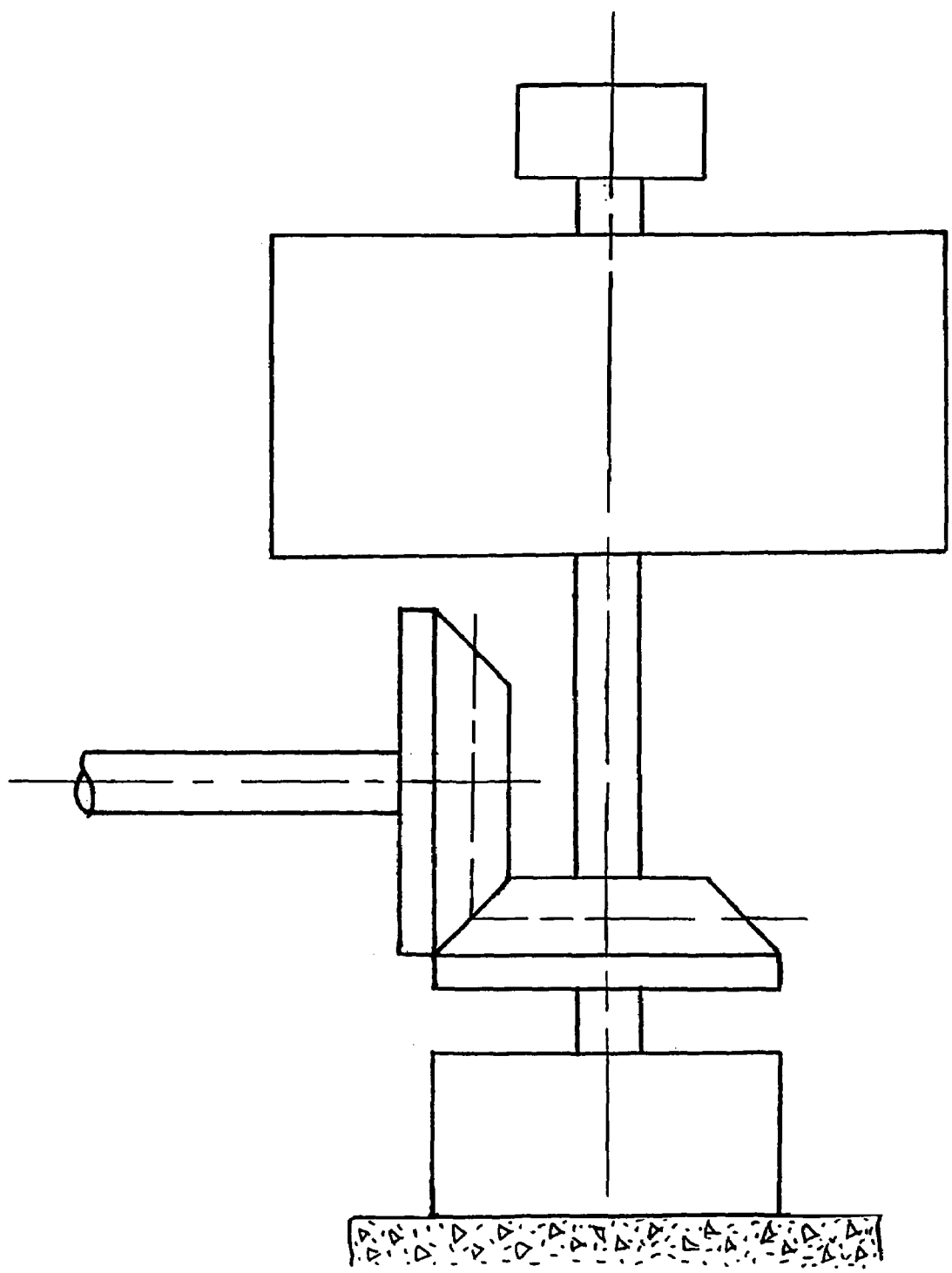

FIG. 42 is a schematic view of the transmission system using conic wheels.

Figure 43:
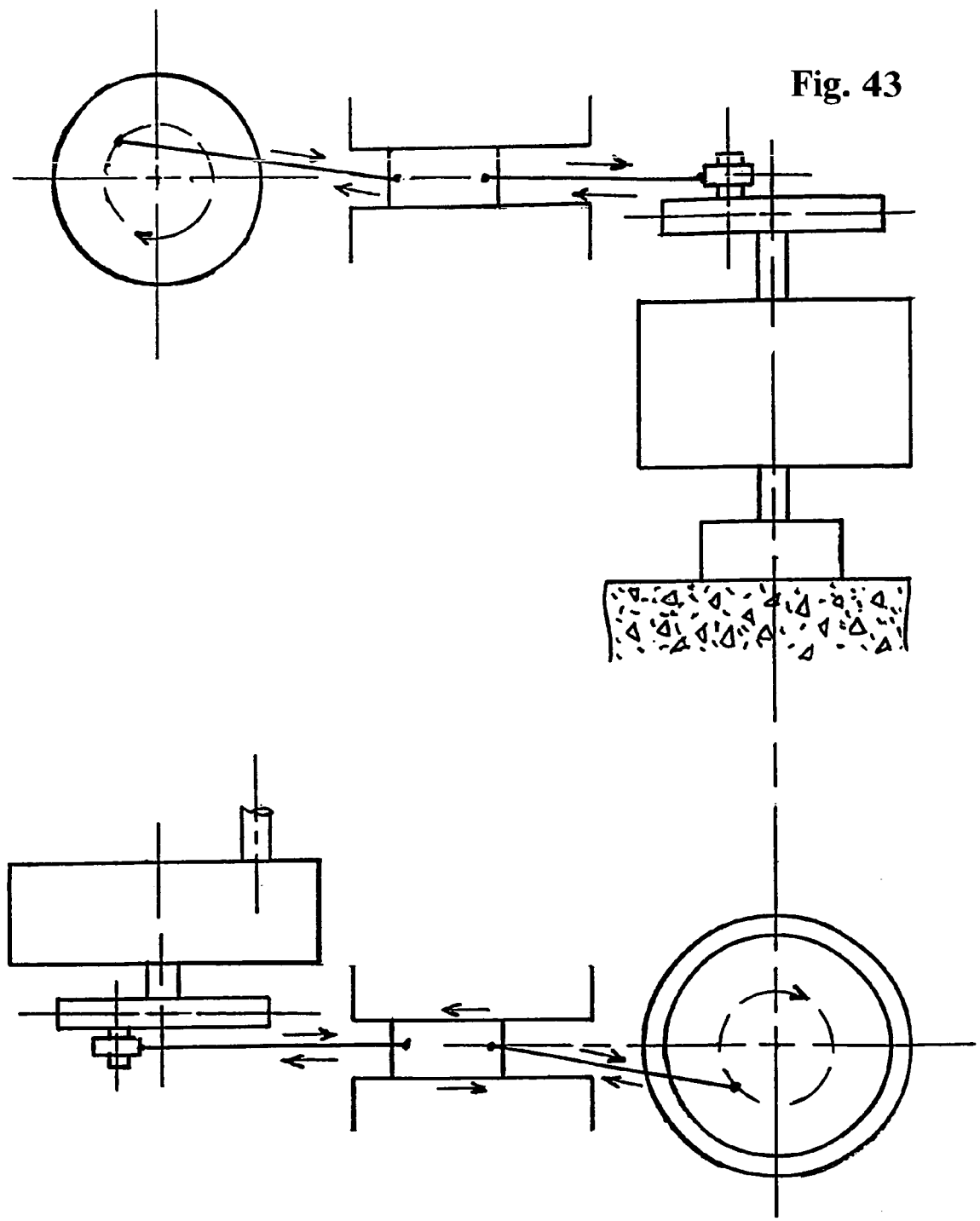

FIG. 43 is a schematic view of the transmission system using a connecting rod and crank handle.

Figure 44:
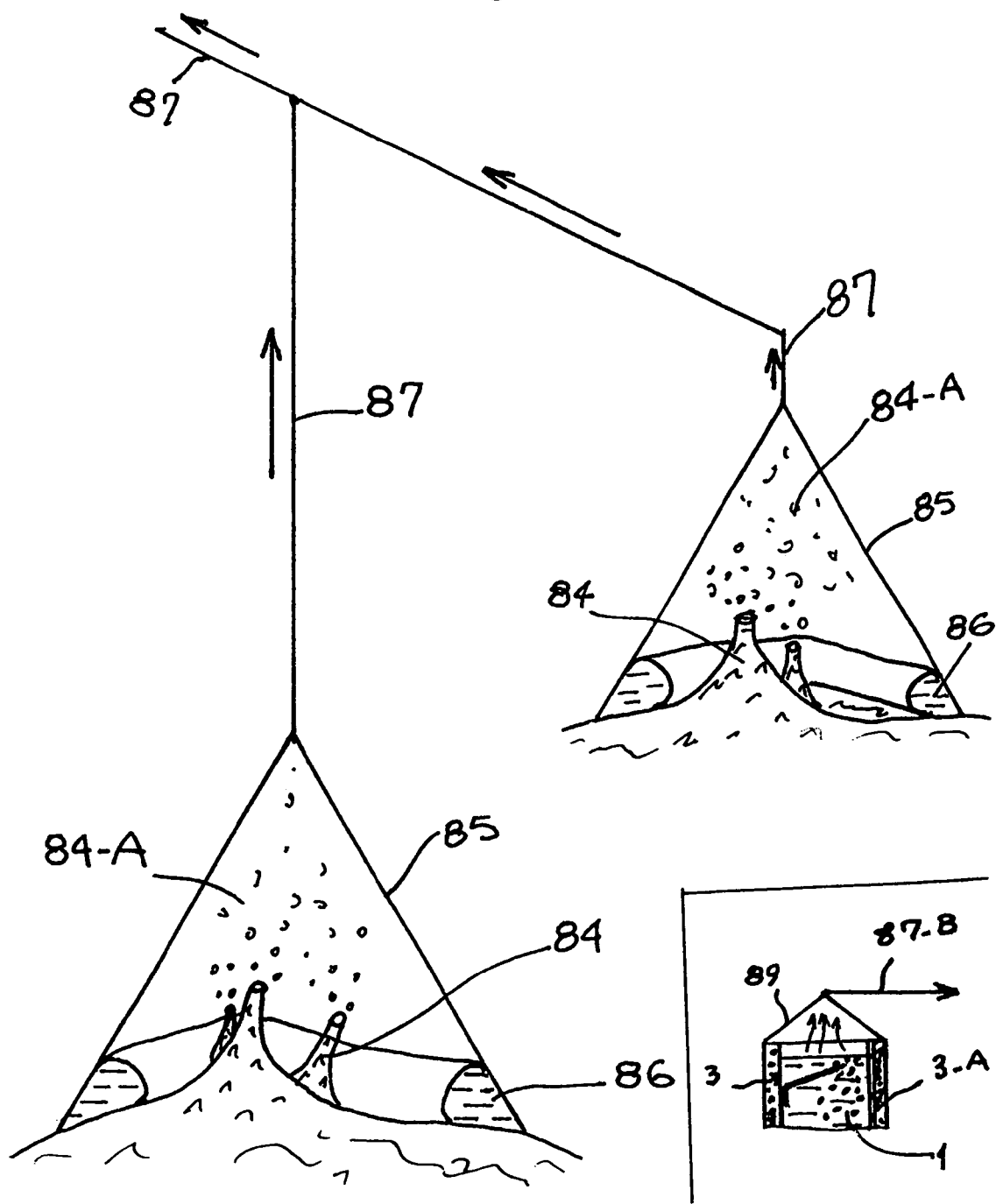

FIG. 44 is a schematic view of black smokers located on the sea bottom and the cones and pipes used to collect gases under pressure.

Figure 45:
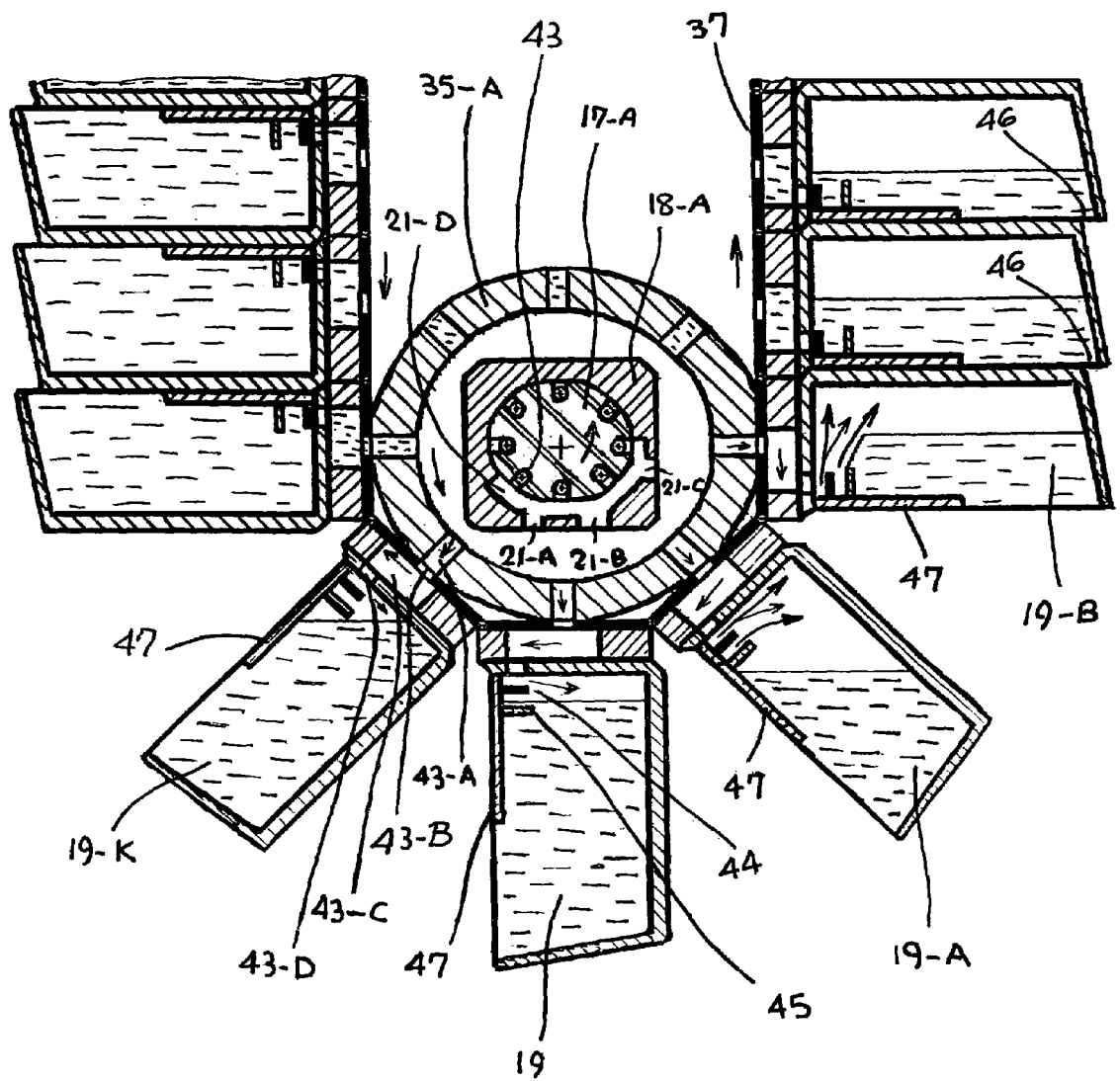

FIG. 45 is a schematic view of containers looping around the lower cogwheel and beginning to receive compressed gas before arriving at the horizontal position.

When considered with the description herein, the characteristics of the invention are apparent from the accompanying drawings, which exemplify an embodiment of the invention for purposes of illustration only, and in which—

Figure 1:
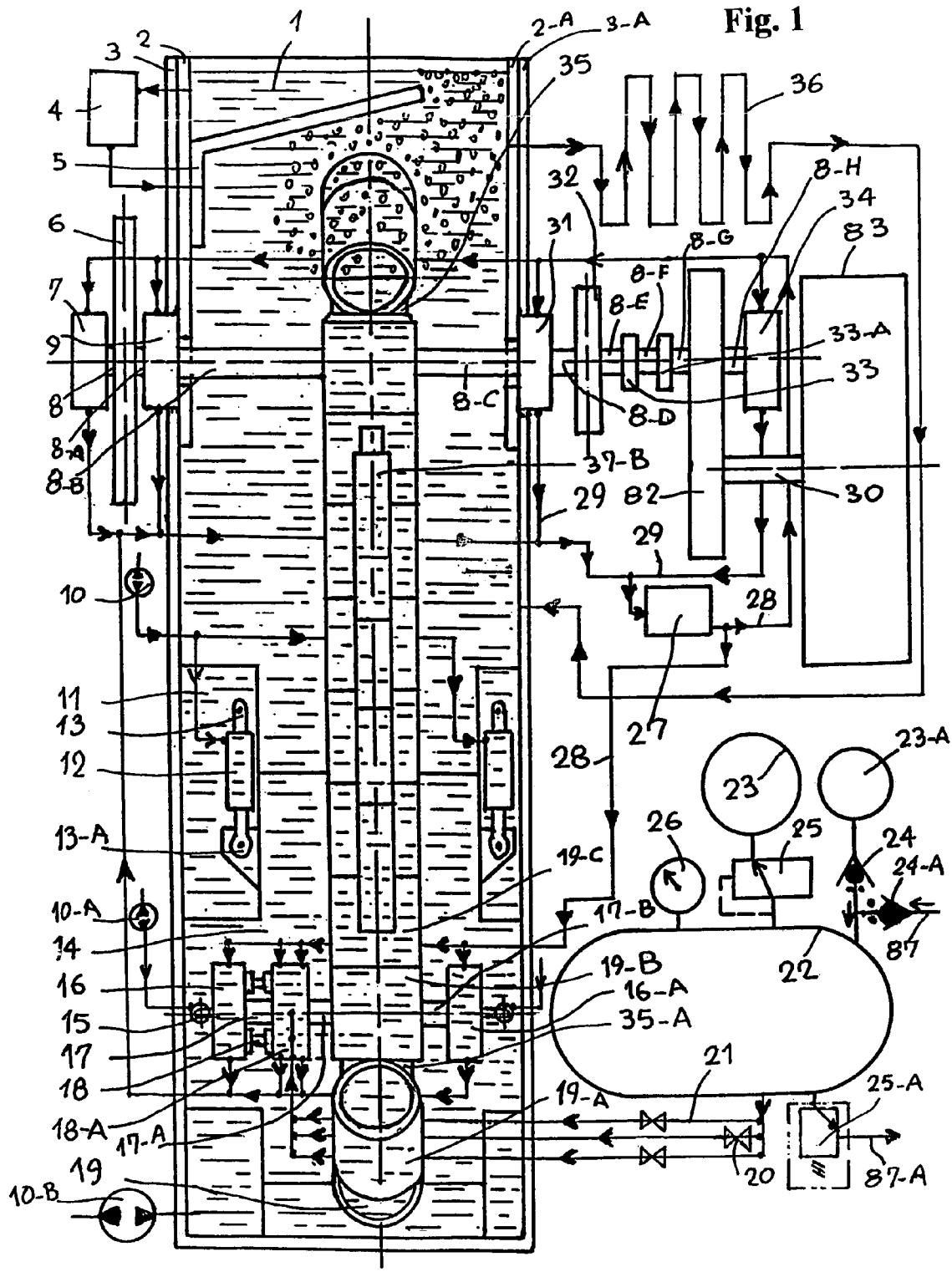
FIG. 1 is a schematic representation of a cross-sectional view of the preferred embodiment of the present invention with most of its main components.

FIG. 1 is a schematic representation of a cross-sectional view of the present invention with most of its principal components:

the walls 3 and 3-A of the pool 1; side panels 2 and 2-A that seal the openings 84-A to the right and 84 to the left where the drive shaft exits the pool; the lower cogwheel 35-A connected to the axle bearing located in the ball bearing housing 16-A by the shaft 17-B and to the rotary transfer joint 18-A by the shaft 17-A, and by the shaft 17 to the axle bearing located in the ball bearing housing 16; the rotary transfer joint 18-A fastened to the ball bearing housing 16 by a frame 18 to prevent it from rotating with the shaft; the tensioning device that adjusts the tension of the endless chain shown with all its parts including the stationary part 11, the sliding part 14, the hydraulic cylinders 12 with their attachment points 13 on the stationary parts 11 and 13-A on the sliding part 14, and the locking and unlocking device 15; the containers 19 in the lower horizontal position, 19-A in the ascending inclined position, 19-B in the ascending vertical position, 19-C and the other containers with thrust ascending in a straight line toward the upper cogwheel; the guiding device 37-B of the endless chain and the containers; the upper cogwheel 35 connected on the left to the shaft 8-B which exits the pool by the opening 84 in the wall 3 through the ball bearing housing 9; the shaft 8-A connected to the right side of the flywheel 6; the shaft 8 connected to the left side of the flywheel rotating in the axle bearing located in the ball bearing housing 7; the upper cogwheel 35 connected on the right to the shaft 8-C which exits the pool by the opening 84-A in the wall 3-A through the ball bearing housing 31; the shaft 8-D passing through the electromagnetic brake 32; the shaft 8-E extended by the coupling sleeves 33 and 33-A and the sections of the shaft 8-F and 8-G entering the gear box 82 to exit by the shaft 8-H which finally enters the axle bearing located in the ball bearing housing 34. From the gear box 82 the shaft 30 exits to run the electrical generator 83 taken as an example. In the bottom right of FIG. 1 are the main compressor 23, the main air tank 22, the relief valve 25 that controls the pressure in the tank 22, the gauge 26 that monitors the pressure in the tank 22, the secondary compressor 23-A that starts the power plant when required, and the check valve 24. The input pipe 87 and the check valve 24-A direct the natural gas under high pressure or the compressed gas coming from black smokers to the main tank 22 of the power plant. The relief valve 25-A directs the natural gas in the pipeline 87-A back into the pipeline if it is under greater pressure than the tank can withstand. To the left and in the middle of FIG. 1 are the hydraulic pump 10 that powers the cylinders 12 of the tensioning device for the endless chain 37, and the hydraulic pump 10-A that powers the cylinders of the device that releases the tension on the endless chain when required. Also in FIG. 1 are the compressed gas input pipes 21 connected to the valves 20 which supply the containers with compressed gas through the rotary transfer joint 18-A, the shaft 17-A, the lower cogwheel 35-A, the chain links of the endless chain 37, the pipes 28 that distribute lubricant from the reservoir 27 to the ball bearing housings 6, 7, 9, 16, 16-A, 31 and 34 and the rotary transfer joint 18-A, the pipes 29 that return the lubricant to the reservoir 27. In the bottom left of FIG. 1 are the pump 10-B that empties the pool when so required for maintenance of the power plant. In the upper left side of FIG. 1 are the centrifugal separator 4 that separates the lubricant collected above the half cover 5, and the half cover 5 that calms the surface of the pool allowing the lubricant to be collected. Finally, in the upper right side of FIG. 1 is the radiator 36 used to cool the excess heat created by the friction of moving parts in the liquid of the pool if required.

FIG. 2 is a schematic representation of the opening of the pool of the power plant, and a cross-sectional view taken along line A—A of the same Figure including the half cover 5 of the pool fastened to the walls by the bolts 5-A.

FIG. 3 is a schematic side view of the upper and lower cogwheels 35 and 35-A including the endless chain 37, the containers 19 in the lower horizontal position, 19-A in the ascending inclined position, 19-B in the ascending vertical position, located in the bottom of the pool where a predetermined quantity of compressed gas is injected into each container while it passes between the lower horizontal and ascending vertical positions to provide upward lift due to the buoyancy of the liquid, the container 19-B nesting in the container 19-C to enhance the alignment of the ascending containers, the drillings 46 that evacuate the liquid from the containers when the volume of the compressed gas expands due to lower pressures at shallower depths, the containers 19-E, 19-F, 19-G and 19-H flooded by liquid as the gas exits, the container 19-H nesting in the container 19-I to enhance the alignment of the descending containers, the container 19-K in the descending inclined position about to enter the lower horizontal position at the beginning of another buoyant cycle, and the components of the guiding device 37-B, 37-C and 37-D that maintain the endless chain 37 and all the containers 19 . . . in proper alignment when the power plant is running.

Figure 4:
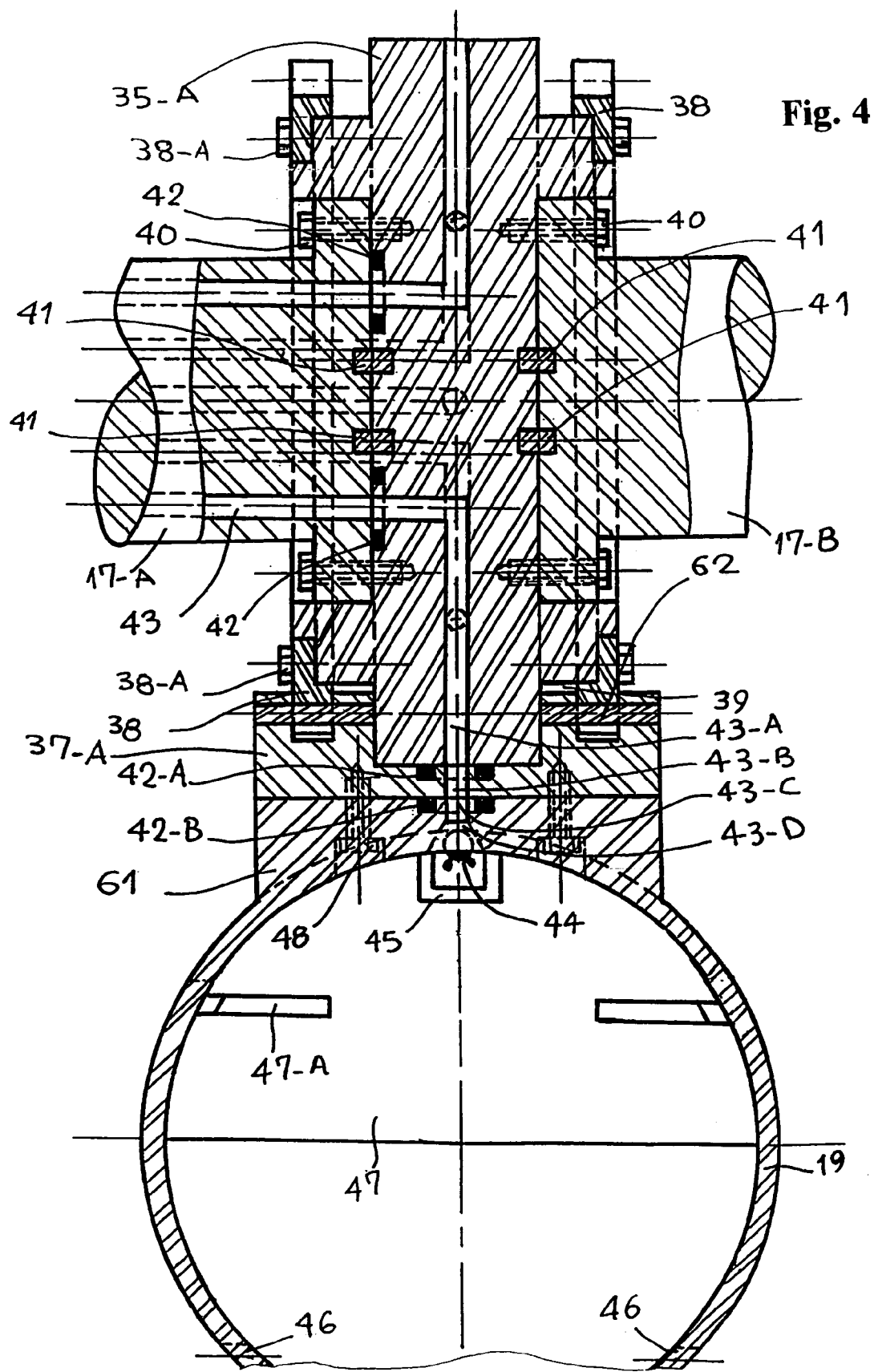
FIG. 4 is a cross-sectional view along line B—B of FIG. 3.

FIG. 4 is a cross-sectional view along line B—B of FIG. 3 including the lower cogwheel 35-A, the container 19 in the lower horizontal position, the chain link 37-A of the endless chain 37, the shafts 17-A and 17-B of the lower cogwheel 35-A, the drillings 43 in the peripheral part of the shaft 17-A, the drillings 43-A in the lower cogwheel 35-A, the drilling 43-B in the chain link 37-A of the endless chain 37, the drilling 43-C in the base of the container 19, the milled groove 43-C in the base 61 of the container 19, the check valve 44, the deflecting device 45 that diverts the compressed gas toward the closed end of the container to avoid spilling the compressed gas, the half cover 47 of the opening of the container 19 that contains the compressed gas within the container during injection, the seal 42 between the shaft 17-A and the lower cogwheel 35-A, the seal 42-A between the lower cogwheel 35-A and the chain link 37-A of the endless chain 37, the seal 42-B between the chain link 37-A of the endless chain 37 and the container 19, the stubs 41 used to align the shafts 17-A and 17-B with the lower cogwheel 35-A, the cogs 38 of the cogwheel 35-A, the spindles 62 of the chain link 37-A of the endless chain 37, the bolts 38-A used to fasten the cogs 38 to the lower cogwheel 35-A, the bolts 48 used to fasten the container 19 to the chain link 37-A of the endless chain 37, and the bolts 40 used to fasten the shafts 17-A and 17-B to the lower cogwheel 35-A.

Figure 5:
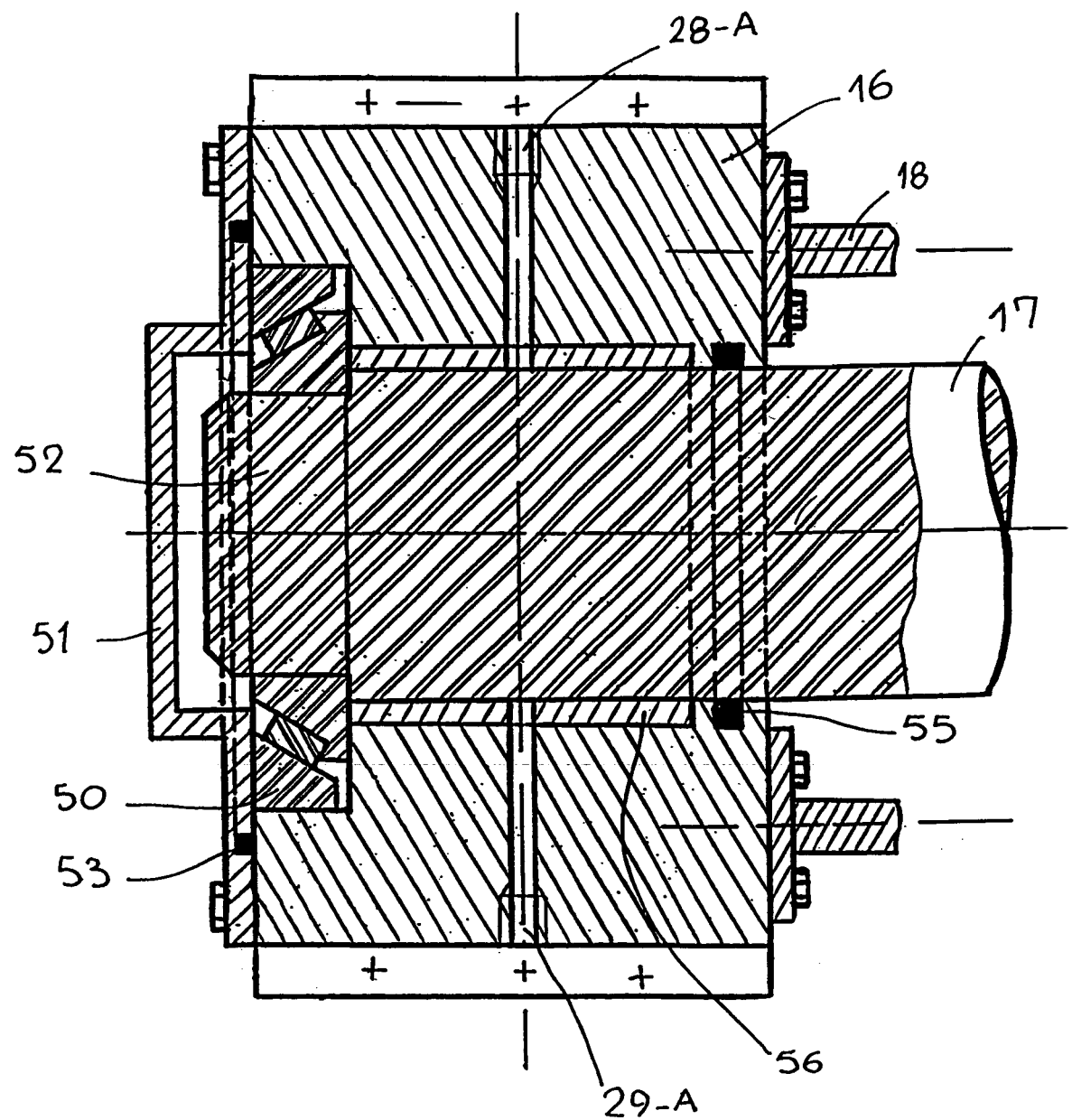
FIG. 5 is a cross-sectional view along line C—C of FIG. 11.

FIG. 5 is a cross-sectional view along line C—C of FIG. 11 including the axle bearing located in the ball bearing housing 16 of the lower cogwheel 35-A, the shaft 17, the bearing 56, the multi-purpose ball bearing 50 that supports and facilitates the rotation of the lower cogwheel 35-A and eliminates its axial movements to the left, the ball bearing cover 51, the seals 53 and 55, part of the frame 18 that holds the rotary transfer joint on the ball bearing housing 16, the drillings 28-A and 29-A that lubricate the ball bearing housing 16.

Figure 6:
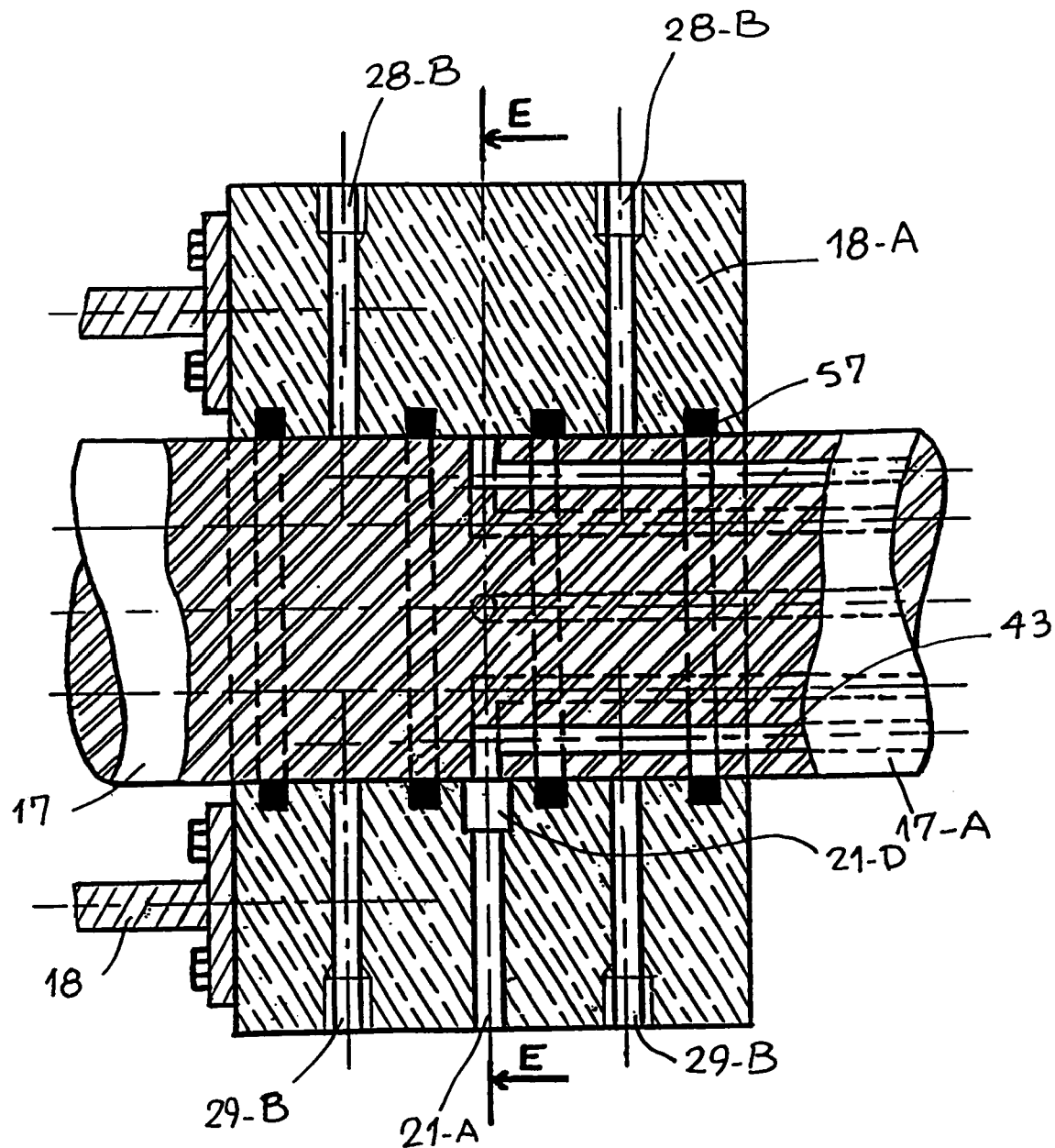
FIG. 6 is across-sectional view along line C–D of FIG. 11.

FIG. 6 is a cross-sectional view along line C–D of FIG. 11 including the rotary transfer joint 18-A and the other extremities of the frame 18 that holds the rotary transfer joint 18-A on the ball bearing housing 16. The milled groove 21-D and the drilling 21-A through which the compressed gas coming from the main tank 22 transits to the containers 19, 19-A and 19-B through the drillings 43 machined in the peripheral part of the shaft 17-A, the drillings 28-B and 29-B that lubricate the rotary transfer joint 18-A and the seals 57.

Figure 7:
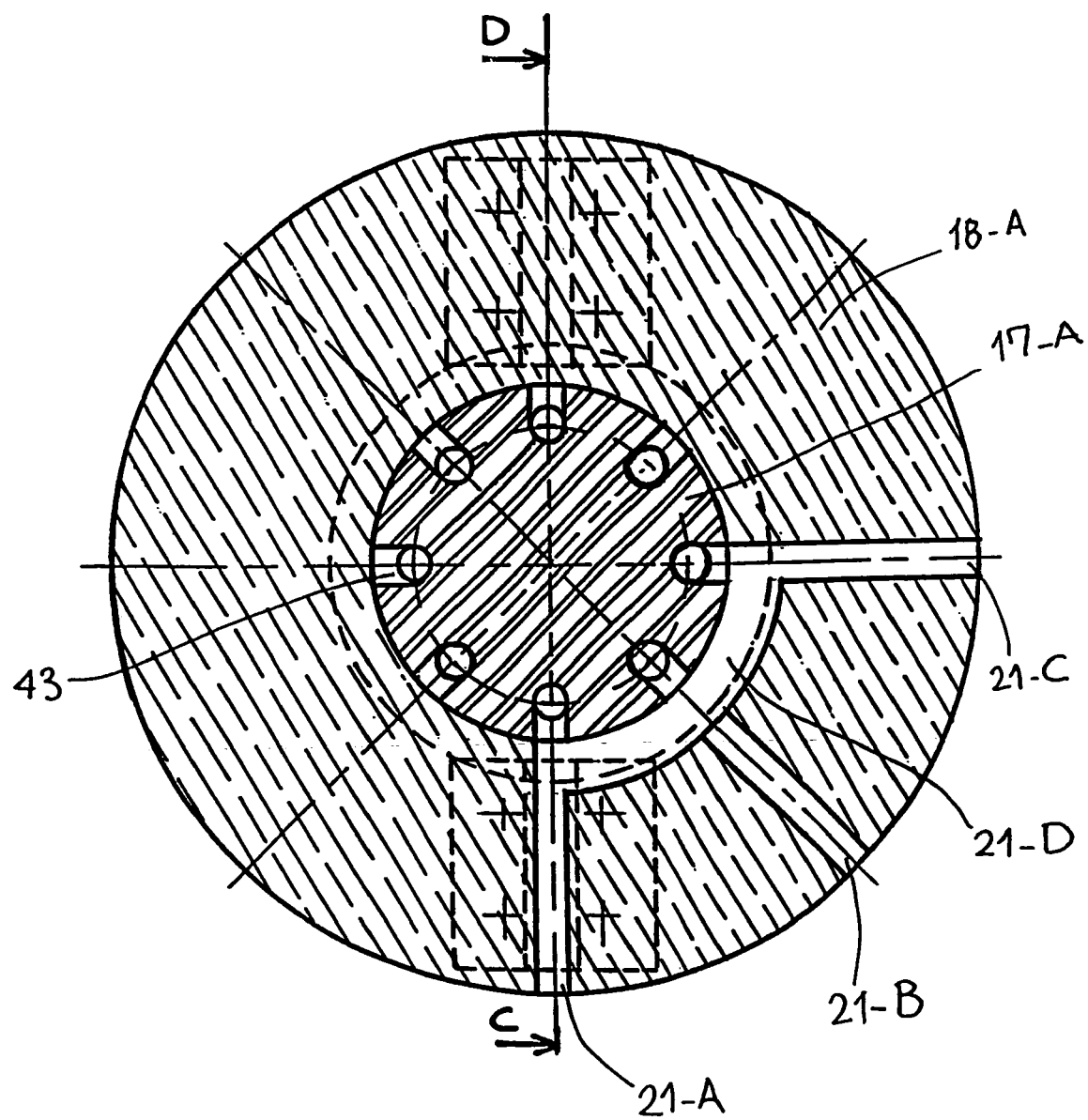
FIG. 7 is a cross-sectional view along line E—E of FIG. 6.

FIG. 7 is a cross-sectional view along line E—E of FIG. 6 including the shaft 17-A and the drillings 43, the stationary part of the rotary transfer joint 18-A, the drillings 21-A, 21-B and 21-C, and the milled groove 21-D that allow the compressed gas coming from the main tank 22 to transit to the containers 19, 19-A and 19-B simultaneously and continuously without interruption through the drillings 43 in the peripheral part of the shaft 17-A, the drillings 43-A in the lower cogwheel 35-A, and the drillings 43-B in the chain links 37-A of the endless chain 37.

Figure 8:
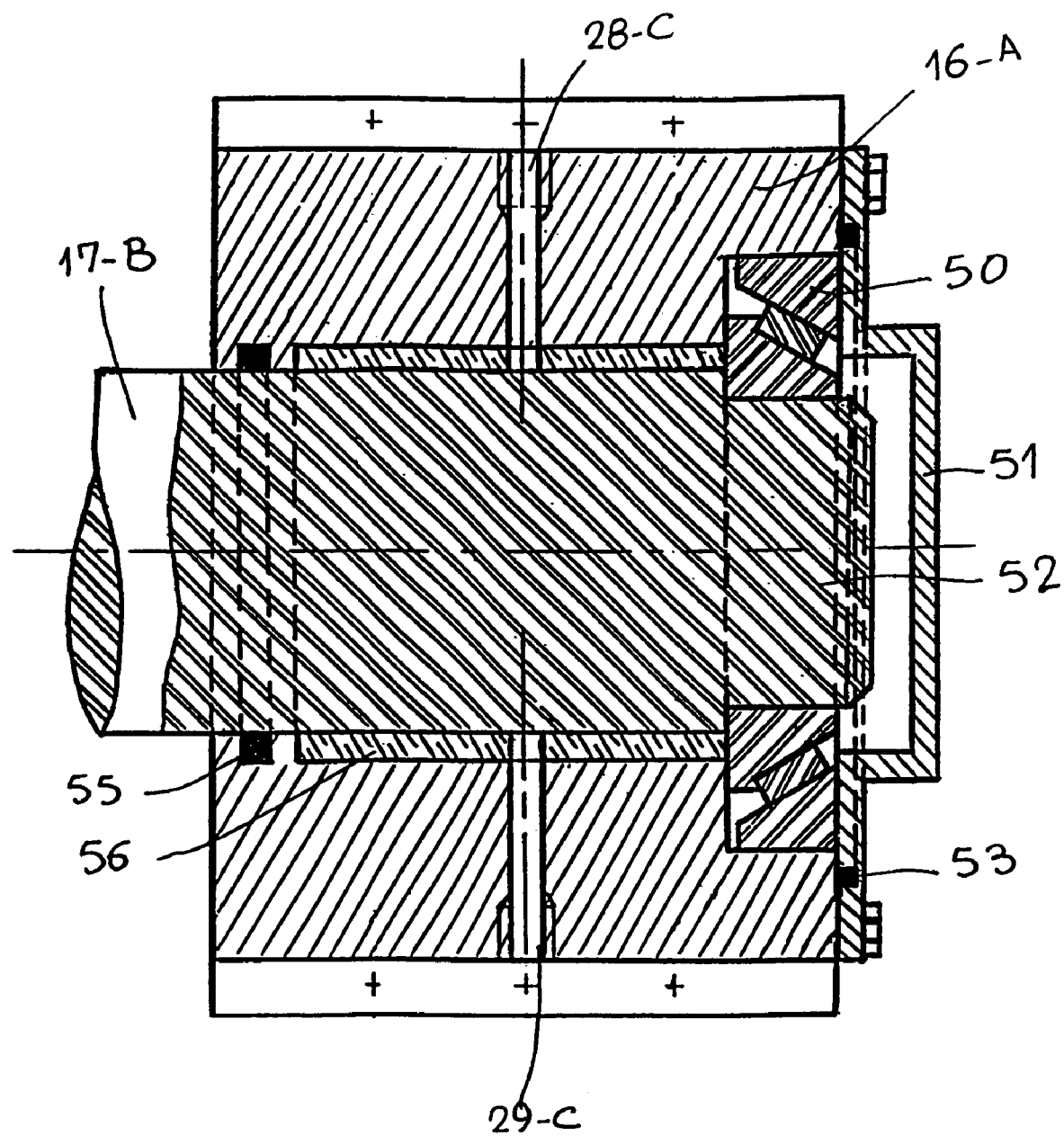
FIG. 8 is a cross-sectional view along line F—F of FIG. 11.

FIG. 8 is a cross-sectional view along line F—F of FIG. 11 including the axle bearing 56 located in the right ball bearing housing 16-A of the lower cogwheel 35-A, the shaft 17-B and the multi-purpose ball bearing 50 that supports and facilitates the rotation of the lower cogwheel 35-A while eliminating its axial movements to the right, the ball bearing cover 51, the seals 53 and 55, and the drillings 28-C and 29-C that lubricate the ball bearing housing 16-A.

Figure 9:
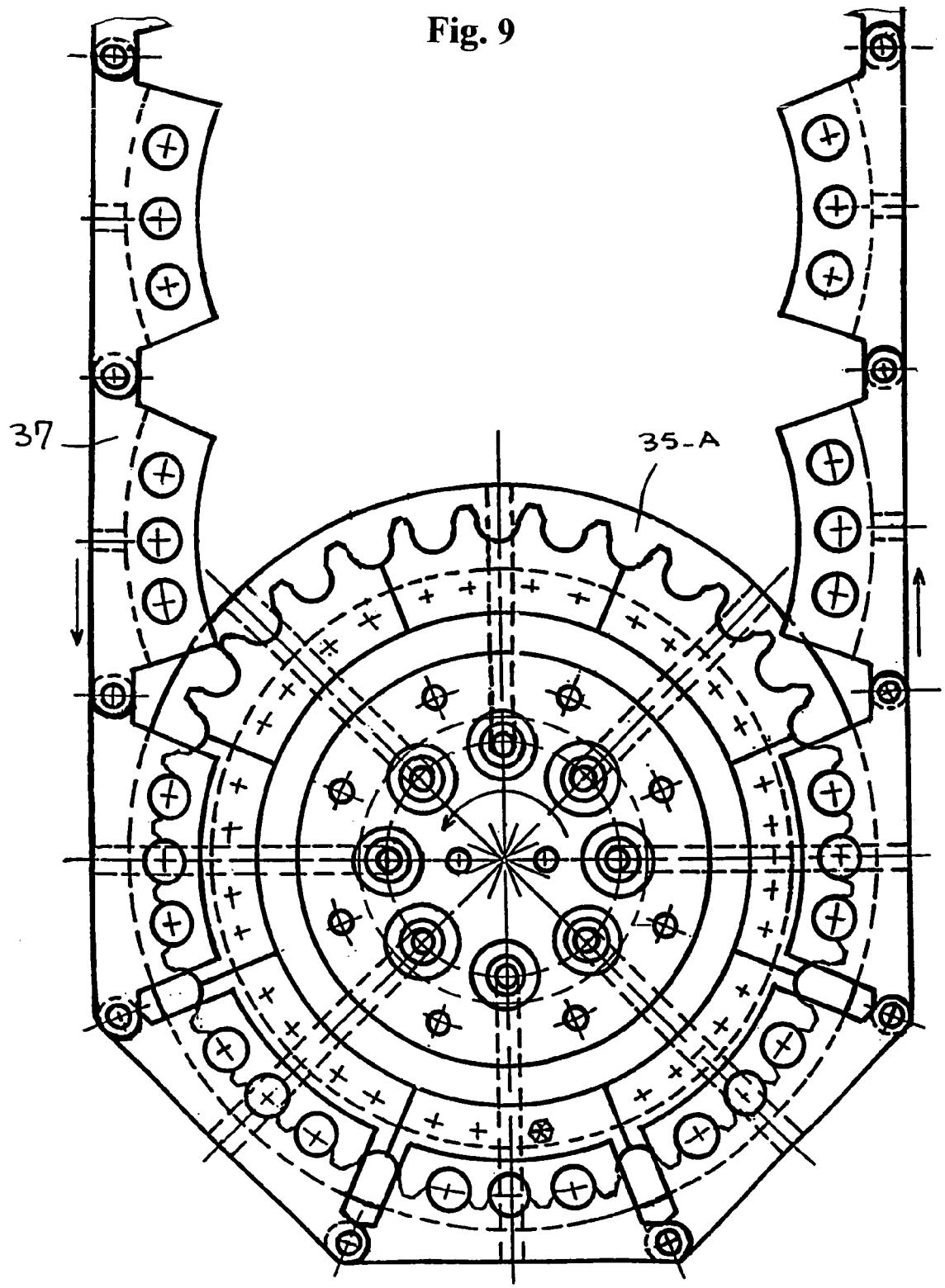
FIG. 9 is a side view of the lower cogwheel and the chain.

FIG. 9 is a side view of the lower cogwheel 35-A and the chain 37. The ratio of the arc of 45 degrees of a chain link of the endless chain to the circle of the wheel is 1 to 8.

FIG. 10 is a schematic view of the lower cogwheel 35-A installed on the frame of the tensioning device that adjusts the tension of the endless chain 37 including the hydraulic cylinders 12, the locking device 15 assisted by the grooves 58 that are machined in the stationary part 11.

FIG. 11 is a cross-sectional view along line G—G of FIG. 10 including the tensioning device for the endless chain 37 comprised of the stationary part 11, and the milled groove 11-A in which part 14 slides through the part 14-A when it is pushed by the hydraulic cylinders 12. When the desired tension for the endless chain 37 is reached, the cylinders 12 are extended no further. At this moment, the spring 59-A pushes the tongue 59 into the groove 58 to hold the sliding part 14 in place, thereby maintaining the tension on the endless chain 37. To reduce the tension on the endless chain 37, the hydraulic cylinders 12 are extended just enough to release the tongue 59. The hydraulic cylinders 12-A are then retracted just enough to allow the tongue 59 to clear the groove 58. The tongue is held in this position as the cylinders 12 are released. At this moment, the endless chain will slacken to permit maintenance.

FIG. 12 is a front view of a container 19 including its base 61, the drillings 48-A for fastening the container to the chain link 37-A of the endless chain 37, the milled groove 43-C for transferring the compressed gas into the container 19 through the drilling 43-D located near the opening, the outside end 60 where the seal 60-A is fitted to eliminate the hard contacts between the containers when they nest together while ascending or descending, the drillings 46 that allow the liquid to exit the container into the pool 1 when the volume of compressed gas expands due to the lower pressures at shallower depths during ascent.

FIG. 13 is a cross-sectional view along line H—H of FIG. 12 including the container 19, the check valve 44, the milled groove 43-C that allows the transfer of compressed gas into the container 19 through the drilling 43-D, the deflector 45 that diverts the compressed gas toward the closed end of the container, the half cover 47 of the opening of the container 19 kept in place by the device 47-A, the bevelled opening 60-B of the container 19 that aligns the containers during their ascent or descent, the corresponding protuberance 60 and the seal 60-B on the exterior of the closed end of the container 19, the drillings 46 that allow the liquid to exit the container into the pool when the volume of the compressed gas expands due to the lower pressures at shallower depths during ascent.

FIG. 14 is a cross-sectional view along line I—I of FIG. 12 including the container 19, the check valve 44, the deflector 45 that diverts the injected compressed gas, the milled groove 43-C, the drilling 43-D where the gas enters the container 19, the half cover 47 with its holding device 47-A, and the drillings 48-A for fastening the containers on the chain link 37-A of the endless chain 37.

FIG. 15 is a cross-sectional view of two ascending containers 19-B and 19-C depicting the way the containers nest together during their ascent from the bottom of the pool to the upper cogwheel. FIG. 15 includes the check valve 44 in the closed position, the protuberance 60 of the container 19-B nesting in the bevelled opening 60-B of the container 19-C, the seal 60-A in place between the two containers, and the drillings 46 that allow the liquid to exit the container into the pool when the volume of compressed gas expands due to the lower pressures at shallower depths during ascent.

FIG. 16 is a cross-sectional view of two descending containers 19-H and 19-I depicting the way the containers nest together in their descent from the upper cogwheel to the bottom of the pool. FIG. 16 includes the check valve 44 is in the closed position, the protuberance 60 of the container 19-H nesting in the bevelled opening 60-B of the container 19-I with the seal 60-A in place between the two containers, and the drillings 46 that allow the liquid to exit the container into the pool as the volume of the compressed gas expands due to the lower pressures at shallower depths during ascent.

FIG. 17 depicts a chain link 37-A of the endless chain 37 and a cross-sectional view along line R—R including the spindles 62, the drillings 48-A for fastening the container to the link 37-A of the endless chain 37, the drilling 43-B that transfers the compressed gas into the container, the groove 42-A—A that houses the seal 42-A so as to avoid leaking any compressed gas between the endless chain and the lower cogwheel when the container is in position to receive the compressed gas, the rings 64 housing the bearings 67 that allow the chain pin 63 to move freely, and the rings 65 into which the chain pin 63 is pressure mounted and secured by the set screw 62.

FIG. 18 is an enlarged cross-sectional view along line T—T of FIG. 17. It includes the bearings 67 composed of an antifriction alloy that hinges the chain links 37-A at their pins 63.

FIG. 19 is an enlarged cross-sectional view along line S—S of FIG. 17. It includes the rings 65 in which the pin 63 is pressure mounted to form the endless chain, and the set screw 62 that secures the shaft 63.

FIG. 20 is a longitudinal view and a radial cross section of a pin 63 that holds the chain links together to form the endless chain 37.

FIG. 21 is a side view of the endless chain 37 including the parts 37-B, 37-C and 37-D of the guiding device that aligns the endless chain and the containers, thereby ensuring that the power plant runs smoothly.

FIG. 22 is a cross-sectional view along line J—J of FIG. 3. It includes the upper cogwheel 35, the container 19-F in the upper horizontal position, the chain link 37-A of the endless chain 37, the alignment stubs 41 that align the shafts 8-B and 8-C with the upper cogwheel 35, the bolts 40 that fasten the shafts 8-B and 8-C to the upper cogwheel 35, the bolts 38-A that fasten the cogs 38 to the upper cogwheel 35, the bolts 48 that fasten the container 19-F to the endless chain 37, and the seal 42-B between the container 19-F and the endless chain 37.

FIG. 23 is a cross-sectional view along line K—K of FIG. 24. It includes the opening 84 for the left ball bearing housing 9 of the drive shaft of the upper cogwheel 35 in the wall 3 of the pool 1, the panel 2 that seals the pool at this level, the tongue 71 that fastens and seals the two parts of the panel 2, the bearing 75 of the shaft 8-A/8-B, the seals 70, and the drillings 28-D and 29-D that lubricate the axle bearing located in the ball bearing housing 9.

FIG. 24 is a front view of the panel 2 that seals the pool where the drive shaft exits the pool 1 to the left through the opening 84 of the wall 3.

FIG. 25 is a cross-sectional view along line L—L of FIG. 26. It includes the flywheel 6, the shafts 8 and 8-A of the flywheel, and the bolts 6-A that fasten the two shafts 8 and 8-A to the flywheel 6.

FIG. 26 is a side view of the flywheel 6 with the shaft 8-A and the bolts 6-A.

FIG. 27 is a cross-sectional view of the ball bearing housing 7 on the left side shaft 8 of the flywheel 6. It includes the ball bearing housing 7, the shaft 8, the bearing 56, the multi-purpose ball bearing 50 that holds and facilitates the rotation of the flywheel 6 while eliminating movements of the drive shaft to the left, the cover 51, the seals 53 and 55, and the drillings 28-E and 29-E that lubricate the ball bearing housing 7.

FIG. 28 is a cross-sectional view along line M—M of FIG. 29. It includes the opening 84-A for the right ball bearing housing 31 of the drive shaft of the upper cogwheel 35 on the wall 3-A of the pool 1, the panel 2-A that seals the pool at this level, the tongue 71-A that fastens and seals the two parts of the panel 2-A, the bearing 75 of the shaft 8-C/8-D, the seals 70 and the drillings 28-F and 29-F that lubricate the axle bearing located in the ball bearing housing 31.

FIG. 29 is a front view of the panel 2-A that seals the pool where the drive shaft exits the pool 1 to the right through the opening 84-A of the wall 3-A.

FIG. 30 is a side view of the upper cogwheel 35 and the chain 37.

FIG. 31 is a cross-sectional view of the disk 32-A of the Foucault current electromagnetic brake 32 including the disk 32-A attached to the drive shaft 8-D/8-E of the power plant, the bolts 32-B, and the key 32-C between the shaft 8-D/8-C and the disk 32-A. The electromagnetic brake 32, combined with a gear box, regulates the rotation speed of the generator or any other device desired to be driven by the power plant.

FIG. 32 is a cross-sectional view along line N—N of FIG. 34. It includes the left coupling sleeve 33 that extends the drive shaft 8-E of the power plant if required.

FIG. 33 is a cross-sectional view along line N—N of FIG. 34 including the right coupling sleeve 33-A that extends the drive shaft 8-E of the power plant if required.

FIG. 34 is a cross-sectional view along line P—P of FIG. 32 or FIG. 33. It includes the ridges 82 and the grooves 82-A of the shaft 8-F, the key 81, and the bolts 78-B that fasten the two parts of the coupling sleeve 78 and 78-A together.

FIGS. 35, 36, 37 and 38 are detailed views of the components of the device used to extend the drive shaft of the power plant, if required, including the two parts 78 and 78-A of the coupling sleeve 33 or 33-A, the bolts 78-B, the key 81, and the drive shaft 8-F.

FIG. 39 is a schematic view of the gear box 82 that drives the generator 83 or any other device at the desired speed.

FIG. 40 is a cross-sectional view of the axle bearing located in the ball bearing housing 34 of the drive shaft 8-H beside the gear box 82. It includes the drive shaft 8-H, the bearing 56, the multi-purpose ball bearing 50 that holds and facilitates the rotation of the drive shaft 8-H while eliminating its movements to the right, the cover 51, the seals 53 and 55, and the drillings 28-G and 29-G that lubricate the axle bearing located in the ball bearing housing 34.

FIG. 41 is a schematic view of the drive shaft 30 running an electrical generator 83.

FIG. 42 is a schematic view of the transmission system using conic wheels.

FIG. 43 is a schematic view of the transmission system using a connecting rod and crank handle.

FIG. 44 is a schematic view of the black smokers 84 located in the sea bottom, the cones 85 with the pipes 87 used to recover the compressed gas 84-A, the water inflatable seals 86 that provide a seal between the cones and the sea-bed when filled with water, the pipes 87 that bring the compressed gas to the main tank 22 of the power plant, the cover 89 of the pool 1 used to recover the natural gas 84-A after exiting the containers with thrust to be redirected toward thermal power stations or elsewhere via a natural gas pipeline 87-A at any desired lower pressure.

FIG. 45 is an alternate schematic view of containers looping around the lower cogwheel and receiving compressed gas before arriving at the lower horizontal position to increase power. It includes the lower cogwheel 35-A, the stationary part of the rotary transfer joint 18-A, the enlarged milled groove 21-D, the drillings 21-A, 21-B and 21-C, the lower wheel axle 17-A, the drillings 43 in the peripheral part of the shaft 17-A of the lower cogwheel 35-A, the drillings 43-A in the lower cogwheel, the drillings 43-B in the chain links, the milled groove 43-C in the base of each container, the drillings 43-D, the check valves 44, the containers 19-K, 19, 19-A and 19-B receiving compressed gas simultaneously and continuously without interruption as they pass from the descending inclined position through the lower horizontal and ascending inclined positions to the ascending vertical position, the deflectors 45, the half covers 47, the drillings 46 that allow the liquid to exit the container into the pool 1 when the volume of compressed gas expands due to the lower pressures at shallower depths during ascent.

It should be understood, of course, that this power plant can be built from various materials and in different dimensions according to the quantity of energy required. The drawings do not show every step in the construction of the present invention, but they set out the overall result clearly.

Before running the power plant, all the components have to be in place:

1) The pool has to be filled with the chosen liquid, water in the case of the power plant illustrated, and the top horizontal container on the upper cogwheel must be fully or partially immersed for efficient power production.

2) The axle bearings 16, 16-A and the rotary transfer joint 18-A are in place and coupled to the lower cogwheel 35-A through the shafts 17, 17-A and 17-B.

3) The stationary part 11, the moving part 14, the hydraulic cylinders 12 and 12-A, and the locking device 15 of the chain tensioning device that adjusts the tension of the endless chain are all in place and set to provide the proper tension to the endless chain 37.

4) All the guiding devices are in place to guide the endless chain and the containers so that the power plant runs smoothly.

5) The axle bearings 7, 9, 31 and 34; the shafts 8, 8-A, 8-B, 8-C, 8-D, 8-E, 8-F, 8-G and 8-H; the flywheel 6; the electromagnetic brake 32; and the gear box 82 are all in place.

6) The shaft 30 and the generator 83 are in place.

7) The lubricant reservoir 27, the pipes 28 and 29 that lubricate the axle bearings 7, 9, 16, 16-A, 31 and 34 as well as the rotary transfer joint 18-A are all in place.

8) The pipes 21 and the main valves 20 are in place to allow the compressed gas to flow from the main tank 22 to the containers with thrust.

9) If the fuel for the power plant is compressed air from a conventional compressor:
   a) the main compressor 23 is connected to the main tank 22 through the check valve 25, and the gauge 26 is in place; and
   b) the secondary compressor 23-A that starts the power plant is connected to the main tank 22, and a combustion or other type of engine, supplies power to run it.

10) If the compressed air is produced by a Taylor hydraulic compressor or by an ocean wave air compressor, the compressed air supplies the main tank 22 as would the main compressor 23.

11) If the fuel is compressed gas from black smokers in the sea bottom:
   a) the cones 85 are in place to collect the gas 84-A produced by the black smokers 84;
   b) the inflatable water seals 86 are in place to provide a seal between the cones 85 and the sea bed;
   c) the pipes 87 are connected to the main tank 22 to transit the gas through the relief valve 25-A; or if the compressed gas is natural gas, the pipe 87-A is installed for the recovery of any excess volume of natural gas; and
   d) the cover 89 and the pipe 87-B are installed on top of the pool 1 to collect the natural gas after it exits the containers with thrust at the desired lower pressure.

Once all the components are in place, the power plant is ready to run.

1) Using compressed air produced by a conventional compressor:
   the secondary compressor 23-A is started to fill the main tank 22.

2) Using geothermal or compressed natural gas:
   the pipes 87 are connected to the main tank 22.

3) The valves 20 are opened to send the compressed gas to the rotary transfer joint 18-A through the pipes 21. The compressed gas enters through the drillings 21-A, 21-B and 21-C to the milled groove 21-D machined into the stationary part of the rotary transfer joint 18-A and then into each container looping around the lower cogwheel between the lower horizontal and the ascending vertical positions or, if advance injection is desired, between the descending inclined and the ascending vertical positions passing through the lower horizontal and ascending inclined positions; in this case the containers 19, 19-A and 19-B or alternately the containers 19-K, 19, 19-A and 19-B receive compressed gas simultaneously and continuously without interruption through the drillings 43 in the peripheral part of the shaft 17-A, through the drillings 43-A in the lower cogwheel 35-A, through the drillings 43-B in the chain links 37-A of the endless chain 37, through the milled groove 43-C and through the drillings 43-D in the containers in position to receive the compressed gas and through the check valves 44, provided that the gas pressure is greater than the hydrostatic pressure in the pool at the point where the compressed gas is injected into the containers.

4) Before leaving the lower cogwheel, the container 19-A receives a volume of compressed gas that will not escape due to expansion until the container reaches the top of its ascent on the upper cogwheel just before it begins to incline.

5) As the containers are forced upward due to buoyancy, they move the endless chain 37, setting the upper and lower cogwheels 35 and 35-A in motion, followed by more containers looping around the lower cogwheel and receiving compressed gas in turn. When the column of all the containers with thrust contains the maximum amount of compressed gas, the power plant is at maximum power; the device that aligns the endless chain and the containers is providing smooth rotation to the power plant, eliminating whipping and vibration.

6-a) When the container arrives at the end of its ascent, it begins inclining to exit gas; at the same time, liquid starts flooding the container with the result that there is minimal resistance during the container's descent.

6-b) In a power plant that uses the excess pressure of natural gas, a cover is installed to collect the gas after it exits the containers so that the gas proceeds normally.

7) The buoyant cycle repeats when the container returns to the position on the lower cogwheel where compressed gas once again starts flowing into it. The repeating buoyant cycle is responsible for the power plant's energy production.

8) Due to the movement of the endless chain 37, the upper cogwheel 35 rotates; the flywheel 6 on the left ensures that the power plant has constant rotation; the generator 83 on the right is driven at a predetermined speed regulated by the gear box 82 and the electromagnetic brake 32.

9) If the power plant is running using compressed air produced by a conventional compressor:
when the generator starts producing electricity, part of the energy produced can be used to run the compressor motor and other accessories while the rest of the energy produced can be distributed for consumption elsewhere.

10) Discounting forced and intentional stoppages, the result obtained from the preceding is a highly desirable power plant that transforms the potential energy of fluids into mechanical, electrical or other forms of energy.

It should be understood, of course, that the foregoing disclosure relates to only a preferred embodiment of the invention, and that it is intended to cover all changes, and modifications of the example of the invention herein chosen, for the purposes of the disclosure, which do not constitute departures from the spirit and scope of the invention.

The volume of the compressed gas in the containers with thrust is a function of the hydrostatic pressure on each container due to its position in the pool of the power plant according to Boyle's Law.

A—For power plants using compressed air, the formula is:

$$\frac{V}{V1} = \frac{P1 + \text{Atmospheric pressure}}{P + \text{Atmospheric pressure}}$$

because the air exits directly into the atmosphere.

B—For power plants using the excess pressure of natural gas, the formula is:

$$\frac{V}{V1} = \frac{P1 + \text{Pressure under the sealed cover of the pool}}{P + \text{Pressure under the sealed cover of the pool}}$$

V=The volume of compressed air or natural gas at any depth in the pool, where the pressure is P.

V1=The new volume of compressed air or natural gas at any new depth in the pool, where the new pressure is P1.

Atmospheric pressure is in the order of 1.013 bars. The pressure under the sealed cover of the pool varies around 4 bars.

The advantage of using the excess pressure of natural gas is because it is free energy; that is why the power plant can be used instead of expansion valves to reduce natural gas pressures while producing energy.

The pressure in natural gas systems varies between approximately 3800 psig and 60 psig.

Proof of the positive energy transformed in the power plant, the subject of the present invention, through the potential energy of compressed air produced by a conventional compressor 1—Take, for example, a flow of 0.6554235852 cubic meters per minute of compressed air at 350 bars produced by a Compair compressor (booster) the H5470 which admits the air at 15 bars and delivers it at 350 bars and has a power of 215 hp.

The volume of free air at 15 bars is:

0.6554235852×(1.01325+350/(1.01325+15)=14.367 cubic meters per minute.

Expressed as free air at atmospheric pressure, 14.367 cubic meters per minute at 15 bars is:

14.367 cubic meters×(1.01325+15)/ 1.01325=227.053898594 cubic meters or 8018 cfm, equivalent to:

8018 cfm×60 minutes×24 hours=11,545,920 cubic feet per day (cfd)

To compress 1,000,000 cubic feet per day of free air at atmospheric pressure to 15 bars requires a compressor of about 193 hp.

11,545,920 cfd requires:

193 hp×(11,545,920/1,000,000)=2,228 hp

The total power required to produce a flow of 0.6554235852 cubic meters per minute at 350 bars to be injected at the bottom of the pool is:

2,228 hp+215 hp=2443 hp

A flow of 0.6554235852 cubic meters per minute at 350 bars can power a plant with a simple or cumulative depth of approximately 3,500 meters [350 bars×(10 meters for every 1 bar)].

For the purpose of this demonstration, the parameters of a power plant in a pool 3,500 meters deep are:

Linear speed of the endless chain: 265.5 meters
Container length: 0.75 meters
Number of ascending containers per minute:

265.5 meters/0.75 meters=354 containers

Volume of free air in each container at atmospheric pressure:

227.053898594 cubic meters per minute/354 containers per minute=0.6413951938 cubic meters Number of all ascending containers:

3,500 meters/0.75 meters=4,666 containers

Total volume of free air in all ascending containers:

0.6413951938 cubic meters×4,666 containers=2,992.74997427 cubic meters

The average volume of compressed air in all ascending containers is approximately 2% of the total volume of free air in all 4,666 containers:

2,992.74997427 cubic meters×2%=59.8549994854 cubic meters.

The radius of every container is:

Square root of [0.6413951938 cubic meters/(0.75 meters×3.1416)]=0.522 meters

The radius of the driving wheel:

[(0.75 meters/2)×cotangent 22.5 degrees]=0.905 meters.

The driving radius of the power plant is:

0.905 meters (radius of wheel)+0.522 meters (radius of container)=1.427 meters

The perimeter of the driving wheel is:

0.905 meters×2×3.1416=5.6863 meters

The rotation speed of the driving wheel is:

265.5 meters/5.6863 meters=46.691 rpm

The weight of every cubic meter of water is approximately 1000 kgs
1 kg=9.81 Newtons (N)
The buoyant force equals the weight of displaced liquid:

59.8549994854 cubic meters (average volume in all the ascending containers)×1,000 kgs×9.81=587,177.544952 N The torque of the power plant is:

587,177.544952 N×1.427 meters (driving radius)=837,902.356646 mN

The power of the power plant:

(Torque×2×3.1416×rpm)/60 seconds 837,902.356646 mN×2×3.1416×46.691 rpm/60 sec.=4,096,908.08838 watts Expressed in horsepower, the power is:

4,096,908.08838 watts/746 watts (for every hp)=5,492 hp

80% to 93% of the energy used to compress the air goes into heat, but most of this energy can be used by transferring the heat produced during compression to the pool of water in which the power plant operates.

A fundamental feature of this invention is its use of the volume of compressed air to produce energy. The pressure of compressed air is simply used to overcome the hydrostatic pressure of the column of liquid.

Transferring the heat produced during air compression to the pool, we posit an increase of 50 degrees Celsius in the temperature of the compressed air in the ascending containers. The resulting power increase is as follows:

$T/T1=V/V1$ OR $T. V1=T1.V$

T=Temperature in degrees Kelvin
V=Volume in cubic meters for these calculations

If the compressed air arrives in the containers at 20 degrees Celsius or (273 degrees Kelvin plus 20=293 Kelvin), then after being heated by the water of the pool the temperature becomes: (293 degrees Kelvin+50)=343 degrees Kelvin.

Applying the formula we get:

293 degrees Kelvin×$V1$=59.8549994854 cubic meters (average volume in all the ascending containers) ×334 degrees Kelvin.

$V1$=59.8549994854×334/293=68.23066137478 cubic meters

In this case, the torque of the power plant is:

68.23066137478 cubic meters×1000 kgs×9.81 Newtons×1.427=955,151.491876 mN

The power is:

955,151.491876×2×3.1416×46.691 rpm/60 sec.=4,670,195.56833 watts

Expressed in horsepower, the power is:

4,670,195.56833 watts/746 watts (for every hp)=6,260 hp

The positive energy before accounting for system inefficiency is:
Before heating the compressed air:

5,492 hp minus 2,443 hp=3,049 hp

After heating the compressed air:

6,260 hp minus 2,443 hp=3,817 hp

Calculation of the momentum of inertia, which determines the speed of rotation of the endless chain:
a—Torque=Momentum of inertia×angular acceleration
b—Momentum of inertia=½ mass (of the turning elements) ×$r^2$ (radius of the turning elements)
c—Angular acceleration: 46.691 rpm×2×3.1416: 60 sec=4.890 radians/sec/sec
d—Torque:
1—59.8549994854 cubic meters (average volume in all ascending containers)×1000 kgs×9.81×1.427 meters (driving radius)=837,902.356646 mN or
2—68.23066137478 cubic meters×1000 kgs×9.81 Newtons×1.427=955,151.491876 mN
e—Torque=momentum of inertia×angular acceleration
1—837,902.356646 mN=Momentum of inertia×4.890 radians/sec/sec
Momentum of inertia=837,902.356646 mN/4.890 radians/sec/sec=171,350 kgs/$m^2$
2—955,151.491876 mN=Momentum of inertia×4.890 radians/$sec^2$
Momentum of inertia=955,151.491876 mN/4.890 radians/$sec^2$=195,328 kgs/$m^2$
f—Momentum of inertia=½ mass (of the turning elements) ×$r^2$ (radius of the turning elements)
If the radius of the turning elements is 2 meters,
1—171,350 kgs/$m^2$=½ mass (of the turning elements)×2×2
Mass of the turning elements=2(171,350 kgs/$m^2$/4)=85,675 kgs
2—195,328 kgs/$m^2$=½ mass (of the turning elements)×2×2
Mass of the turning elements=2(195,328 kgs/$m^2$/4)=97,664 kgs
g—Given constant torque, if the mass is lighter, the rotation speed will increase and vice versa,
Therefore, a slower speed gives sufficient time for the predetermined quantity of compressed air to enter the containers with thrust. This is why a relatively slow speed of 46.691 rpm was chosen for this power plant.

These calculations demonstrate that the quantity of energy generated by the power plant using compressed air produced by a conventional compressor is superior to the quantity of energy consumed by the compressor.

What is claimed is:
1. Hydroelectric power plant designed to transform the potential energy of compressed gas into mechanical and electrical energy through the potential energy of liquids including:

A relatively deep pool filled with a liquid, an endless chain looping around a first and a second wheel, the first wheel is located in the bottom of the pool, and is used to adjust the tension of the endless chain, while the compressed gas passes through it into containers, the second wheel, located in the top of the pool, is used as a driving wheel to transform the linear buoyant force of the containers through the rotation of the endless chain, the containers, fastened to the links of the endless chain, are recipients for the compressed gas; the volume of the compressed gas expands as the pressure decreases at shallower depths according to the position of the container in the pool during its ascent, while expelling the liquid out through the drillings located near the opening of the container, thereby creating a growing buoyant force which is equal to the weight of the displaced liquid, a device used for the distribution of compressed gas into the containers as they loop around the first wheel on an arc between the lower horizontal position, at which point the compressed gas starts flowing, and the ascending vertical position, at which point the compressed gas ceases flowing, as the containers move off the first wheel in succession, propelled upward toward the second wheel by buoyancy, the power plant is characterized by the device used for the distribution of compressed gas into each container, including;

a groove milled into the bore of the stationary part of the rotary transfer joint mounted on the shaft of the first wheel permitting the transfer of compressed gas simultaneously and continuously without interruption only to those containers positioned on the arc of the first wheel between the lower horizontal and ascending vertical positions depending on the direction of rotation, permitting the injection of the predetermined quantity of compressed gas required for the proper functioning of the power plant, drillings, machined axially in the peripheral part of the shaft of the first wheel, radially in the first wheel itself and radially in the chain links used to transfer the compressed gas to the adjacent containers, an alignment of each axial drilling in the shaft of the first wheel with a corresponding radial drilling in the first wheel itself, so that the compressed gas starts to flow into each container as it arrives at the lower horizontal position on the first wheel, the outside surface of the first wheel is machined to form a tight fit with the inside surface of the chain links as they pass by, so that the drillings of the first wheel and the drillings of the chain links line up, permitting the transfer of compressed gas without leaks at the appropriate time to the adjacent containers, an airtight fit between the inside diameter of the bore of the stationary part of the rotary transfer joint and the outside diameter of the shaft of the first wheel, to prevent the compressed gas present in the groove milled in the stationary part of the rotary transfer joint from going into the other drillings which are not yet ready to transfer gas toward any other container.

2. Hydroelectric power plant as claimed in claim 1 and characterized in addition by:

The containers all have the same form and dimensions, each container has a half cover to help retain the compressed gas flowing into the container as it arrives at the horizontal position on the first wheel thereby permitting complete injection of the predetermined quantity of compressed gas into each ascending container.

3. Hydroelectric power plant as claimed in claim 1 or 2 and characterized in addition by:

The milled groove in the stationary part of the rotary transfer joint may be enlarged to enhance the injection of compressed gas into descending containers before they reach the lower horizontal position as long as the compressed gas does not escape from the container, The half cover will help prevent this from happening, If this optional configuration is used, the insignificant effect of negative buoyancy on the descending container is counterbalanced by the additional positive buoyancy on the ascending container located between the lower horizontal and ascending vertical positions, Overall, the cumulative volume of the additional compressed gas in all ascending containers has a strongly positive impact on the buoyancy already created by the weight of the liquid displaced by the volume of compressed gas injected between the lower horizontal and ascending vertical position.

* * * * *